US010324979B2

(12) United States Patent
Raanani et al.

(10) Patent No.: US 10,324,979 B2
(45) Date of Patent: *Jun. 18, 2019

(54) AUTOMATIC GENERATION OF PLAYLISTS FROM CONVERSATIONS

(71) Applicant: AffectLayer, Inc., Tel Aviv-Yafo (IL)

(72) Inventors: Roy Raanani, Mill Valley, CA (US); Russell Levy, Raanana (IL); Micha Yochanan Breakstone, Raanana (IL)

(73) Assignee: AffectLayer, Inc., Tel Aviv-Yafo (IL)

( * ) Notice: Subject to any disclaimer, the term of this patent is extended or adjusted under 35 U.S.C. 154(b) by 42 days.

This patent is subject to a terminal disclaimer.

(21) Appl. No.: 15/793,691

(22) Filed: Oct. 25, 2017

(65) Prior Publication Data

US 2018/0046710 A1  Feb. 15, 2018

Related U.S. Application Data

(63) Continuation-in-part of application No. 15/168,675, filed on May 31, 2016, now Pat. No. 10,051,122.
(Continued)

(51) Int. Cl.
*H04M 3/00* (2006.01)
*H04M 5/00* (2006.01)
(Continued)

(52) U.S. Cl.
CPC .......... *G06F 16/639* (2019.01); *G06F 16/683* (2019.01); *G06F 17/2785* (2013.01);
(Continued)

(58) Field of Classification Search
CPC ........... H04M 3/42221; H04M 3/5232; H04M 2203/556; H04M 2203/551; H04M 3/5191
(Continued)

(56) References Cited

U.S. PATENT DOCUMENTS 5,920,297 A  7/1999  Alexander
6,882,723 B1  4/2005  Peterson et al.
(Continued)

OTHER PUBLICATIONS

Co-Pending U.S. Appl. No. 15/168,675 of Raanani, R., et al., filed May 31, 2016.
(Continued)

*Primary Examiner* — Thjuan K Addy
(74) *Attorney, Agent, or Firm* — Perkins Coie LLP

(57) ABSTRACT

A moment identification system automatically generates a playlist of conversations having a specified moment. A moment can be occurrence of a specific event or a specific characteristic in a conversation, or any event that is of specific interest for an application for which the playlist is being generated. For example, a moment can include laughter, fast-talking, objections, response to questions, a discussion on a particular topic such as budget, behavior of a speaker, intent to buy, etc., in a conversation. The moment identification system analyzes each of the conversations to determine if one or more features of a conversation correspond to a specified moment, and includes those of the conversations in the playlist having one or more features that correspond to the specified moment. The playlist may include a portion of a conversation that has the specified moment rather than the entire conversation.

40 Claims, 13 Drawing Sheets

Related U.S. Application Data

(60) Provisional application No. 62/169,456, filed on Jun. 1, 2015, provisional application No. 62/169,445, filed on Jun. 1, 2015.

(51) Int. Cl.

| | | |
|---|---|---|
| *G06F 16/638* | (2019.01) | |
| *G10L 15/183* | (2013.01) | |
| *G10L 15/18* | (2013.01) | |
| *G10L 25/63* | (2013.01) | |
| *G06K 9/00* | (2006.01) | |
| *G10L 15/26* | (2006.01) | |
| *G10L 15/02* | (2006.01) | |
| *G06N 20/00* | (2019.01) | |
| *G06F 16/683* | (2019.01) | |
| *G06F 17/27* | (2006.01) | |
| *G06N 7/00* | (2006.01) | |
| *H04M 3/42* | (2006.01) | |
| *H04M 3/51* | (2006.01) | |
| *H04M 3/523* | (2006.01) | |
| *G10L 17/02* | (2013.01) | |
| *G06Q 30/00* | (2012.01) | |
| *G06K 9/62* | (2006.01) | |
| *H04N 7/14* | (2006.01) | |
| *G10L 25/51* | (2013.01) | |
| *G10L 17/26* | (2013.01) | |

(52) U.S. Cl.
CPC ......... *G06K 9/00744* (2013.01); *G06N 7/005* (2013.01); *G06N 20/00* (2019.01); *G06Q 30/016* (2013.01); *G10L 15/02* (2013.01); *G10L 15/183* (2013.01); *G10L 15/1815* (2013.01); *G10L 15/265* (2013.01); *G10L 17/02* (2013.01); *G10L 25/63* (2013.01); *H04M 3/42221* (2013.01); *H04M 3/5175* (2013.01); *H04M 3/5232* (2013.01); *G06K 9/00268* (2013.01); *G06K 9/00302* (2013.01); *G06K 9/6256* (2013.01); *G06K 2009/00738* (2013.01); *G10L 17/26* (2013.01); *G10L 25/51* (2013.01); *H04M 2201/40* (2013.01); *H04M 2203/301* (2013.01); *H04M 2203/305* (2013.01); *H04M 2203/357* (2013.01); *H04M 2203/556* (2013.01); *H04N 7/141* (2013.01)

(58) Field of Classification Search
USPC .......... 704/235; 379/265.07, 265.05, 265.06, 379/266.1, 265.03
See application file for complete search history.

(56) References Cited

U.S. PATENT DOCUMENTS

| | | | |
|---|---|---|---|
| 6,898,277 B1 | 5/2005 | Meteer et al. | |
| 6,937,705 B1* | 8/2005 | Godfrey | H04M 3/2281 379/26.01 |
| 7,023,979 B1 | 4/2006 | Wu et al. | |
| 7,039,166 B1 | 5/2006 | Peterson et al. | |
| 7,487,094 B1 | 2/2009 | Konig et al. | |
| 7,729,916 B2 | 6/2010 | Coffman et al. | |
| 8,165,886 B1 | 4/2012 | Gagnon et al. | |
| 8,346,563 B1 | 1/2013 | Hjelm et al. | |
| 8,914,285 B2 | 12/2014 | Pollak et al. | |
| 9,785,891 B2* | 10/2017 | Agarwal | G06N 20/00 |
| 9,900,436 B2 | 2/2018 | Raanani et al. | |
| 2004/0249632 A1 | 12/2004 | Chacon | |
| 2005/0197841 A1 | 9/2005 | Al-Dhubaib et al. | |
| 2007/0038499 A1 | 2/2007 | Margulies et al. | |
| 2007/0265850 A1 | 11/2007 | Kennewick et al. | |
| 2008/0103781 A1 | 5/2008 | Wasson et al. | |
| 2008/0140415 A1 | 6/2008 | Shostak | |
| 2009/0150156 A1 | 6/2009 | Kennewick et al. | |
| 2009/0222313 A1 | 9/2009 | Kannan et al. | |
| 2012/0072254 A1 | 3/2012 | McLean et al. | |
| 2013/0208881 A1 | 8/2013 | Pande et al. | |
| 2014/0025376 A1 | 1/2014 | Wasserblat et al. | |
| 2014/0086402 A1 | 3/2014 | Kan et al. | |
| 2014/0270133 A1 | 9/2014 | Conway et al. | |
| 2014/0317030 A1 | 10/2014 | Shen et al. | |
| 2015/0201077 A1 | 7/2015 | Konig et al. | |
| 2015/0237213 A1 | 8/2015 | Spottiswoode et al. | |
| 2015/0242860 A1 | 8/2015 | Kannan et al. | |
| 2015/0254675 A1 | 9/2015 | Kannan et al. | |
| 2015/0256675 A1 | 9/2015 | Sri et al. | |
| 2015/0348570 A1 | 12/2015 | Feast et al. | |
| 2016/0225372 A1 | 8/2016 | Cheung et al. | |
| 2016/0352902 A1 | 12/2016 | Levy et al. | |
| 2016/0352907 A1 | 12/2016 | Levy et al. | |
| 2017/0187880 A1 | 6/2017 | Raanani et al. | |

OTHER PUBLICATIONS

Co-Pending U.S. Appl. No. 15/168,729 of Raanani, R., et al., filed May 31, 2016.
Non-Final Office Action dated Oct. 20, 2016 of U.S. Appl. No. 15/168,729 of Raanani, R., et al., filed May 31, 2016.
Notice of Allowance dated Feb. 14, 2017 of U.S. Appl. No. 15/168,729 of Raanani, R., et al., filed May 31, 2016.
U.S. Appl. No. 16/017,646 of Raanani, R. et al. filed Jun. 25, 2018.
Corrected Notice of Allowability dated Mar. 21, 2017 of U.S. Appl. No. 15/168,729 of Raanani, R., et al., filed May 31, 2016.
Non-Final Office Action dated Nov. 16, 2017 of U.S. Appl. No. 15/460,931 by Raanani, R., et al., filed Mar. 16, 2017.
Notice of Allowance dated Dec. 19, 2017 of U.S. Appl. No. 15/460,931 by Raanani, R., et al., filed Mar. 16, 2017.
Notice of Allowance dated May 4, 2018 of U.S. Appl. No. 15/168,675 by Raanani, R., et al., filed May 31, 2016.
Non-Final Office Action dated Jan. 24, 2018 of U.S. Appl. No. 15/168,675 by Raanani, R., et al., filed May 31, 2016.

* cited by examiner

AUTOMATIC GENERATION OF PLAYLISTS FROM CONVERSATIONS

CROSS-REFERENCE TO RELATED APPLICATION(S)

This application is a continuation-in-part of U.S. application Ser. No. 15/168,675 titled "MODELING VOICE CALLS TO IMPROVE AN OUTCOME OF A CALL BETWEEN A SALES REPRESENTATIVE AND A CUSTOMER" filed May 31, 2016, which claims the benefit of U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, and U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, all of which are incorporated herein by reference for all purposes in their entirety.

BACKGROUND

With over 2.4 million non-retail inside sales representatives in the United States (U.S.) alone, millions of sales phone conversations are made on a daily basis.[i] However, except for rudimentary statistics concerning e.g., call length and spotted keywords and phrases, sales conversations are left largely unanalyzed, rendering their content inaccessible to modeling, and precluding the ability to optimize them for desired outcomes. Recent advances in automatic speech recognition (ASR) technologies, and specifically in large vocabulary continuous speech recognition (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners.

[i]Insidesales.com "Market size 2013" study

DETAILED DESCRIPTION

Figure 1:
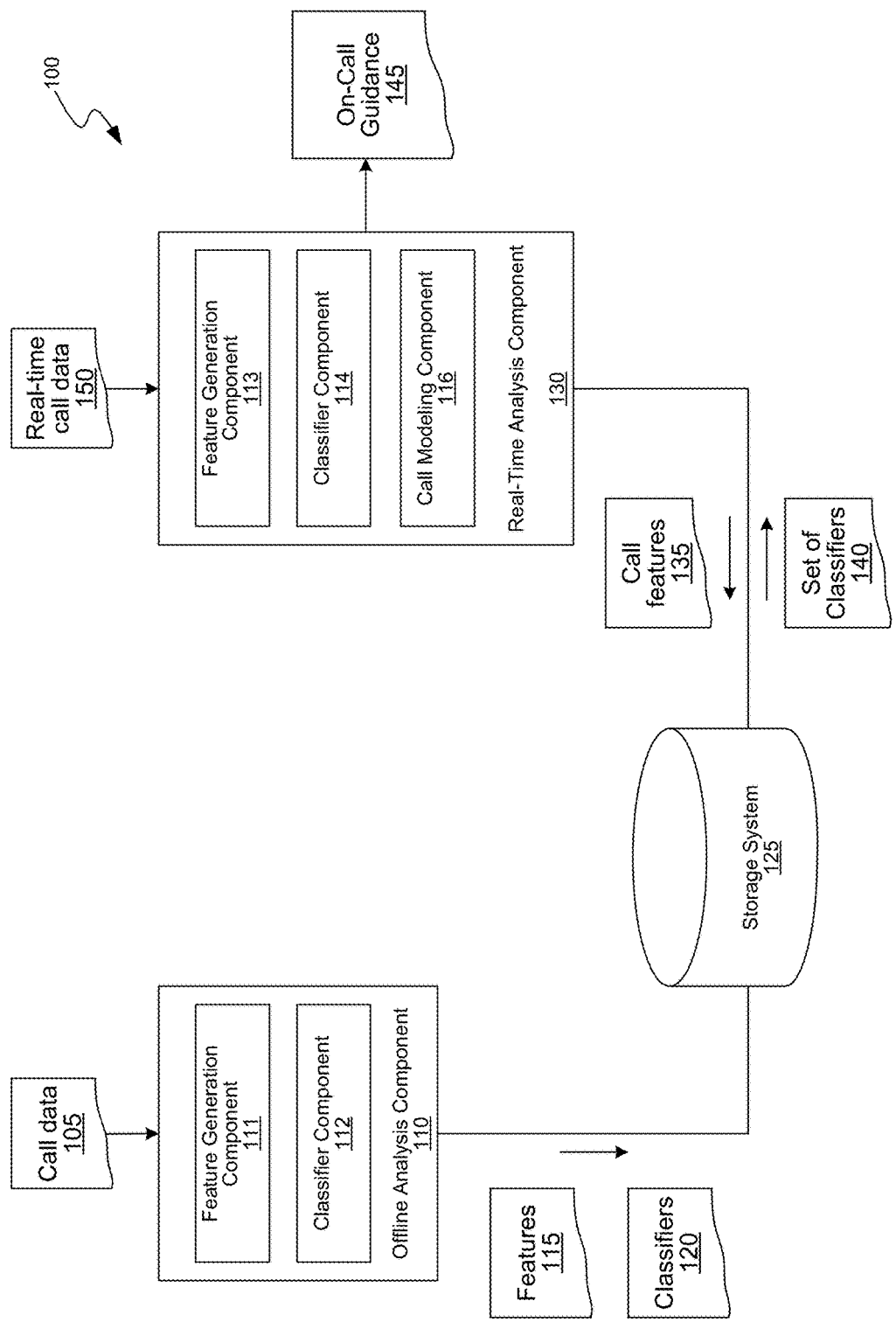
FIG. 1 is a block diagram of a call-modeling system in which the disclosed embodiments can be implemented.

Embodiments are disclosed for a call-modeling system for modeling conversations, e.g., voice conversations, in real time, with the goal of helping users, e.g., sales representatives and/or their managers, to improve and/or guide the outcome of conversations with other users, e.g., customers. One such embodiment can model the calls based on characteristics of the conversation, e.g., voice of the representatives and/or the customers, and content of the conversation, with the goal of positively influencing the outcome of the call. The call-modeling system can generate real-time probabilities for possible outcomes of a real-time conversation, e.g., an ongoing conversation between a specific representative and a customer, and generate specific on-call guidance, which may be either conducive or detrimental to a desired conversation outcome. The generated probabilities and on-call guidance may be used by the representatives and/or their managers to either increase the probability of a desired outcome and/or optimize the conversation for a specified duration if the predicted outcome is not going to be a desired outcome. For example, for renewing a magazine subscription, the call-modeling system can generate an on-call guidance suggesting a representative to engage in a rapport building exercise with the customer if it is determined that doing so increases the chances of the customer renewing the membership by 45%. On the other hand, if the call-modeling system predicts from the on-going conversation that the customer is not going to renew the subscription membership, then the call-modeling system can suggest the representative to wrap up the conversation as soon as possible.

The call-modeling system can include (i) an offline analysis component and (ii) a real-time analysis component. The offline analysis component can take as input conversations between a calling party, e.g., a customer, and a called party, e.g., a representative, and process the conversations using multiple distinct components to generate multiple features of the conversations. In some embodiments, the conversations can be audio recordings of calls between called party and the calling party (collectively referred to as "participants"). The features can include transcripts of audio recordings, vocabulary, semantic information of conversations, summarizations of utterances and various natural language entailments, summarization of a call, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.), personal attributes (e.g., an age, an accent, and a gender), customer-representative pair attributes that indicate specific attributes associated with both the speakers that contribute to a specified outcome (e.g., similarity of speech rate between the representative and the user, extrovert/introvert matching, or gender or age agreement).

Note that a recording of the conversation can be of a conversation that is any of telephone based, Voice over Internet Protocol (VoIP) based, video conference based, Virtual Reality (VR) based, Augmented Reality (AR) based, or based on any online meetings, collaborations or interactions, electronic mail (e-mail). The recording can also be of a conversation that has happened between two or more speakers physically located in the same room. In some embodiments, a recording based on any online meetings, collaborations or interactions, or email can be a transcript of the corresponding interaction.

Further, the features can include not only aural features, but also non-aural features, e.g., visual features such as body language of a participant, and facial expressions of the participant, or any combination of aural and non-aural features. The features could also be generated from the transcripts of any of emails, online messages, and online meetings. In some embodiments, any of a word, a phrase, a text, emoji, symbols, or a combination thereof can be used to determine a particular feature. For example, it can be determined that a text such as "Ha Ha" or "rofl" in the transcript can indicate laughter.

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", or "follow-up call scheduled"), and/or a tag that indicates "key moments" of a conversation. A "key moment" or a "moment" can be a specific event or a specific characteristic which occurs in the call. The event can be any event that is of specific interest for a specific application for which the call-modeling system is being implemented. An administrator of the call-modeling system can configure what events in a call have to be identified as a moment. For example, a moment can be laughter, engagement, fast-talking, open-ended questions, objections, or any combination thereof in a conversation. In some embodiments, the moments are identified automatically by a moment identification system. The tags can be generated automatically by the call-modeling system, manually, e.g., by human judgment, or both. In some embodiments, the tags are generated automatically by the call-modeling system. The tag can include various details, e.g., information regarding a moment, a time interval at which the moment occurred in the call, duration for which the moment lasted, information regarding the participants of the call, etc.

The moments can also be notified to and/or shared between the participants during an on-going conversation and/or after the conversation. For example, during a call between a user and a representative, the call-modeling system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

In some embodiments, the offline analysis component uses distinct components to extract the features. The components can include an automatic speech recognition (ASR) component, which can produce a transcription of the conversation, a natural language processing (NLP) component, which can extract semantic information (such as open-ended questions asked, key objections, etc.) from the conversation, an affect component, which can analyze the recording for emotional signals and personality traits (e.g., likeability and trustworthiness), and a metadata component, which can extract data regarding conversation flow (i.e., who spoke when, and how much silence and overlap occurred).

The offline analysis component can analyze the features to generate one or more classifiers that indicate conversation outcomes, e.g., "sales closed", "sales failed." Each of the classifiers indicates a specific outcome and can include a set of features that contribute to the specific outcome. The offline analysis component can generate multiple classifiers for the same outcome; however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

In some embodiments, the offline analysis component generates a classifier for different time intervals or time windows of the conversations. For example, the offline analysis component can analyze the extracted features for seconds 00:05-00:10 of a conversation, seconds 00:20-00:30, and minutes 1:00-2:00, and generate a classifier for each of those time windows. The offline analysis component feeds the extracted features into the machine-learning algorithm to produce multiple classifiers corresponding to the time windows. The time windows can be of varying lengths or fixed lengths. In some embodiments, the offline analysis component can generate classifiers for other relative positions of a conversation. For example, the offline analysis component can generate a classifier corresponding to an instance in the conversation, e.g., when a customer spoke for the first time in the conversation, and analyze features such as a pitch of the voice, a topic the customer spoke about first, and the length of the customer's first talk, to generate the classifier.

The real-time analysis component uses the classifiers to model a real-time conversation, e.g., an ongoing call between a representative and a customer, that helps the representative to increase a probability of a desired outcome of the conversation or optimize the conversation duration in case the real-time analysis component does not predict the desired outcome. The real time analysis component receives real-time call data of an ongoing conversation between the customer and a representative and analyzes the real-time call data to generate a set of features, e.g., using the offline analysis component as described above. The real-time analysis component can then feed the features to the classifiers to generate probabilities of potential outcomes of the call. The real-time analysis component can use the classifiers with highest prediction powers to generate the probabilities of various potential outcomes. In some embodiments, the real-time analysis component measures the prediction powers of the classifiers using an F-score, which, in statistical analysis, is a (possibly weighted) harmonic mean of precision and recall.

The real-time analysis component feeds the extracted features into the classifiers with high F-scores to generate probabilities of possible outcomes. Based on the probabilities, the real-time analysis component can also generate on-call guidance, which encourages the representative and/ or their managers to modify, desist or persist with a specified on-call behavior to increase or decrease the probability of one of the possible outcomes, e.g., a desired outcome such as closing a sale. In some embodiments, the on-call guidance includes a set of suggested features and their values to be adopted, desisted or persisted with by the representative. For example, the on-call guidance can include instructions for the representative to change the rate of speech (e.g., speak slower), use specific key words, or pose more open-ended questions to the customer.

In some embodiments, the on-call guidance can change as the call progresses, e.g., based on the classifiers that are relevant to the call at that particular time of the conversation. For example, during the first two minutes of the call, a classifier that corresponds to the first two minutes of the call may be used to generate the on-call guidance such as instructing the representative to pose open-ended questions to the customer, and then in the third minute, a classifier that corresponds to the third minute of the call may be used to revise the on-call guidance, e.g., suggest to the representative to adjust the speech rate to match with that of the customer.

Additionally, if according to the classifiers, the real-time analysis component predicts the conversation to fail, the on-call guidance may suggest to the representative to quickly wrap up the call in order to spare the representative's time. The on-call guidance of the real-time analysis module may be presented on-screen or via any other interface (e.g., voice instructions given through an ear piece) to the representative and/or the manager. The embodiments can produce real-time probabilities of various outcomes of the conversations, enabling live coaching that can help the representatives in improving the outcomes of the conversations in real-time.

Embodiments are also disclosed for automatically generating a playlist of conversations having a specified moment. As described above, a moment can be a specific event or a specific characteristic which occurs in the conversation. The moment can be any event that is of specific interest for a specific application for which the call-modeling system is being implemented. An administrator of the call-modeling system can configure what events in a conversation have to be identified as a moment. For example, a moment can be laughter, fast-talking, open-ended questions, objections, response to questions, a discussion on a particular topic such as "budget," behavior of a speaker, psychological reaction such as engagement, boredom, intent to buy, etc., or any combination thereof, in a conversation.

A moment identification system can analyze the extracted features of the conversation and identify the specified moment based on the features. For example, if the specified moment to be identified in the conversation is laughter, the moment identification system can analyze the features of the conversation to determine if the conversation had any laughter by any of the speakers in the conversation, e.g., a sales representative of an organization or a customer with who the sales representative is interacting. If any of the features indicate that the conversation had a laughter, then the moment identification system can record the moment metadata, which can include one or more of (a) one or more locations of the conversation at which there is a laughter (such as at minute 5 and minute 6 of the conversation), (b) who is the laughter from, or (c) how long the laughter is. The moment identification system can analyze recordings of a number of conversations and identify all conversations that contain the specified moment, and then generate a playlist of the conversations containing the specified moment.

The moment identification system can generate playlists for various moments and store them in a storage system. For example, a playlist can be generated for conversations having a moment in which the sales representatives responded to questions from the customer. In another example, a playlist can be generated for conversations having a moment in which laughter was recorded from the customer. In yet another example, a playlist can be generated for conversations having a moment in which the customer was angry. In still another example, a playlist can be generated for conversations having a moment in which the topic involved was "budget" or "pricing". The playlists can be used for various purposes, e.g., coaching sales representatives for improving their sales performance, improving an outcome of the sales call. For example, the playlist for "laughter" moment can be used to identify what it is that the sales representative in the conversations said or did that made the customers laugh, and coach other sales representatives to converse on a similar line to make the customers laugh. In another example, the playlist for "anger" moment can be used to identify what is it that the sales representative said or did that made the customers angry, and coach other sales representatives to avoid or take control of such situations. In yet another example, a playlist for "high engagement by the prospect" can be used to coach other sales representative how to ask engaging questions. Another usage of such moment playlist could be to educate parts of the company outside the sales department. For example, a playlist of moments discussing a newly launched feature may be used to share the "voice of the customer" with the product and marketing teams.

Some moments can be referred to as "interesting" moments. A consumer user, e.g., a consumer of the playlists such as sales representatives or managers of sales representatives, can define what moments are interesting. For example, the consumer user can define moments such as "laughter," discussions on topics such as "budget" or "pricing", or prospects' reactions to newly launched product features, as interesting moments. In some embodiments, the moment identification system can automatically determine what moments may be interesting to the consumer users. The moment identification system can automatically identify certain moments as interesting moments in various ways. For example, the moment identification system can identify the interesting moments based on a usage pattern of a recording of a conversation, such as if a particular portion of the conversation has been tagged, or replayed more than a threshold number of times. In another example, the moment identification system can identify the interesting moments based on an anomaly in a conversation, such as a speaker suddenly starting to speak at a pace greater than a specified threshold or compared to that of in other portions of the conversation, a speaker exiting a meeting room while the meeting is still in progress, occurrence of a particular facial expression, a particular portion of the conversation being played in a speed or at a volume level different from the other portions. Various such moments can be identified as interesting moments by the moment identification system, and playlists can be generated for the identified interesting moments.

Turning now to FIG. 1, FIG. 1 is a block diagram of a call-modeling system 100 in which the disclosed embodiments can be implemented. The call-modeling system 100 includes an offline analysis component 110 and a real-time analysis component 130. The offline analysis component 110 can take as input historical call data 105, which includes conversations between participants, e.g., audio recordings of calls between representatives and customers, and process the call data 105 using multiple components to generate features 115 of the conversations, and classifiers 120.

The offline analysis component 110 includes a feature generation component 111 that generates features 115 by analyzing the call data 105 using various techniques, e.g., ASR, NLP, artificial intelligence (AI), machine learning (ML). The features 115 can include transcripts of audio recordings, vocabulary, semantic information of conversations, summarization of a call, summarizations of utterances and various natural language entailments, voice signal associated features (e.g., speech rate, speech volume, tone, and timber), emotions (e.g., fear, anger, happiness, timidity, fatigue), personality traits (e.g., trustworthiness, engagement, likeability, dominance, charisma, confidence, etc.), personal attributes (e.g., age, accent, and gender), and inter-speaker attributes that indicate a comparison between both the speakers (e.g., similarity of speech rate between the representative and the user, extrovert/introvert matching, or gender or age agreement).

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," a measure of "customer satisfaction," and Net Promoter Score (NPS). An outcome can have binary values, e.g., "yes/no", "high/low", or non-binary values, e.g., a probability score, enumerated values like "low, average, medium, high, very high," values on a scale of 0-10, etc. For example, an outcome such as customer satisfaction can be measured using binary values such as "low/high", or using non-binary values, such as a scale of 0-10, enumerated values. Each of the classifiers indicates a specific outcome, a probability of the specified outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal.

In some embodiments, the classifier component 112 generates different classifiers for different time windows of the conversations. For example, the classifier component 112 generates a classifier "C1" for the first two minutes of the conversations and a classifier "C2" for a third minute of the conversations. The classifier "C1" based on the first two minutes of the conversation can indicate that when laughter by a customer and two open-ended questions from the representative is registered, there is a high chance, e.g., 83%, of renewal. The classifier "C2" based on the third minute of the conversation can indicate that when a competitor magazine or the key-phrase "read online" is used, the renewal chances drop to 10%, all of which can occur if customer's speech rate drops below three words per second. Some of the classifiers include features for inter-speaker attributes that indicate a comparison between the speakers that contribute to a specified outcome (e.g., similarity of speech rate between the representative and the user, extrovert/introvert matching, or gender or age agreement).

The features, when extracted from the conversations, can include attributes and values. The classifier determines what values of the features influence a particular outcome of the call. The classifiers 120 can be generated in various formats and is not limited to the above illustrated example format. The classifier component 112 can generate multiple classifiers for the same outcome; however, the multiple classifiers can have distinct sets of features. Further, as described above, the classifier component 112 can generate different classifiers for different time windows of the conversation. The offline analysis component 110 can store the features 115 and the classifiers 120 in a storage system 125.

The call-modeling system 100 includes a real-time analysis component 130 that uses the classifiers 120 to generate on-call guidance for both inbound and outbound calls that will help the representative optimize the call for a desired outcome, or optimize the call duration if the desired outcome is not predicted (i.e., very low chances of the desired outcome are predicted). The real-time analysis component 130 receives real-time call data 150 of an ongoing conversation between a customer and a representative and analyzes the real-time call data 150 to generate a set of features, e.g., call features 135, for the ongoing conversation using a feature generation component 113. In some embodiments, the feature generation component 113 is similar to or the same as the feature generation component 111. The feature generation component 113 generates the call features 135 based on the real-time call data 150, e.g., as described above with respect to the feature generation component 111. The real-time call data 150 can be an early-stage or initial conversation between the customer and the representative.

After the call features 135 are generated, a classifier component 114, which, in some embodiments, is the same as, or similar to the classifier component 112, inputs the call features 135 to the classifiers 120 to determine a set of classifiers 140 that predict possible outcomes of the call based on the call features 135. Each of the set of classifiers 140 indicates a specified outcome of the call and an associated probability of the corresponding outcome. In some embodiments, the classifier component 114 chooses classifiers that have the highest prediction power, which can be measured using an F-score, as the set of classifiers 140. After the set of classifiers 140 are determined, a call-modeling component 116 generates an on-call guidance 145 that includes real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and include those features and values associated with those features in the on-call guidance 145. The on-call guidance 145 notifies the representative to adopt, desist or persist with an on-call behavior consistent with those features to achieve the desired outcome, or to increase the probability of achieving the desired outcome. If the set of classifiers 140 predict that the desired outcome may not be achieved, the call-modeling component 116 may suggest, in the on-call guidance 145, that the representative wrap up the call.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can include an initial or early stage conversation, can be a conversation between the customer and an automated machine, e.g., an interactive voice response (IVR) system, or a representative for gathering preliminary information from the customer that can be useful for generating the on-call guidance.

In some embodiments, the call-modeling system 100 includes a search tool that empowers a consumer user to explore various aspects of a conversation. For example, the search tool allows the consumer user to search for anything that came up on the call, e.g., both linguistic and meta-linguistic. The search tool can be used to further analyze the conversation, extract appropriate features and use them to improve the classifiers in predicting the outcome of the calls. For example, the search tool can be used to find calls that registered a laughter from the customer, calls in which the customer spoke for the first time after a specified number of minutes, calls in which the customer sounded angry, calls in which customer mentioned competitors, calls in which the representatives engaged in rapport building, calls in which the representative modulated speech rates at various instances of the call, calls in which short or open-ended questions were asked at a high frequency, or any combination of the above.

Figure 2:
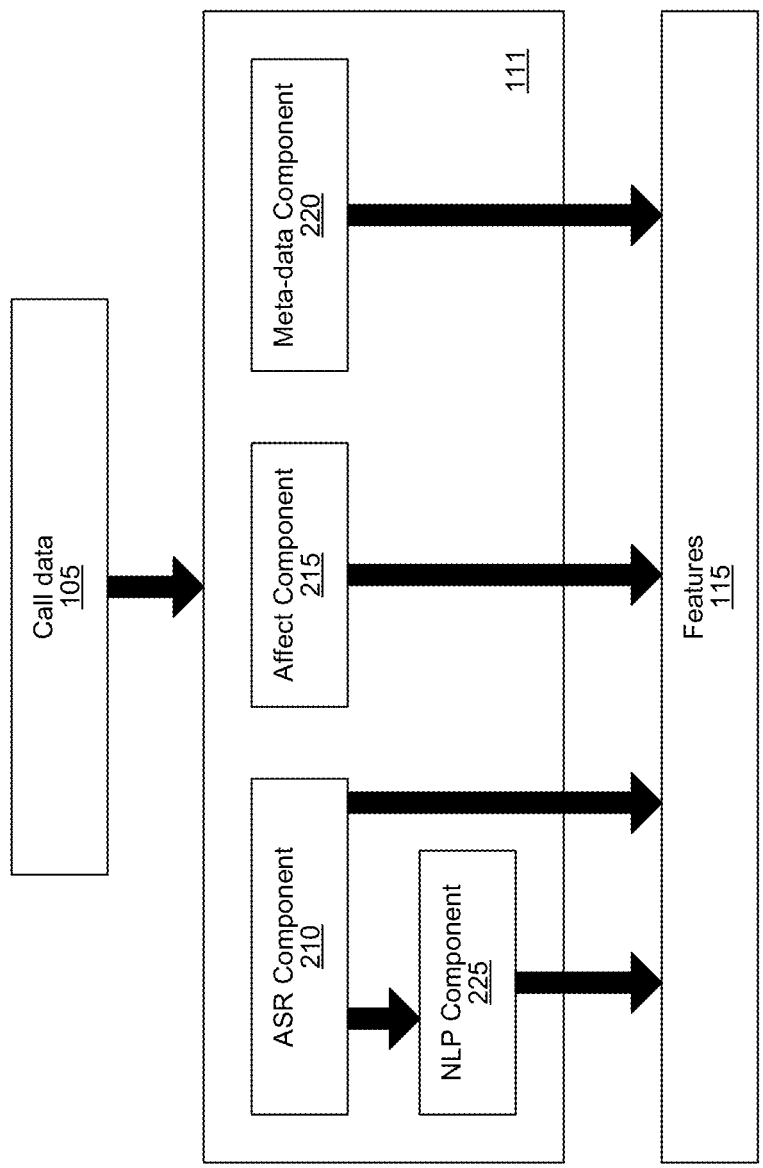
FIG. 2 is a block diagram of a feature generation component of the call-modeling system for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, charisma, confidence, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency-Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as speech rate, speech volume, tone, timber, range of pitch, as well as any statistical data over such features (e.g., maximal speech rate, mean volume, duration of speech over given pitch, standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, charisma, confidence, etc.) and perceived or absolute personal attributes such as age, accent, and gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level, which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112. One or more components of the feature generation component 111 can use AL and/or ML techniques to extract one or more of the features 115.

Figure 3:
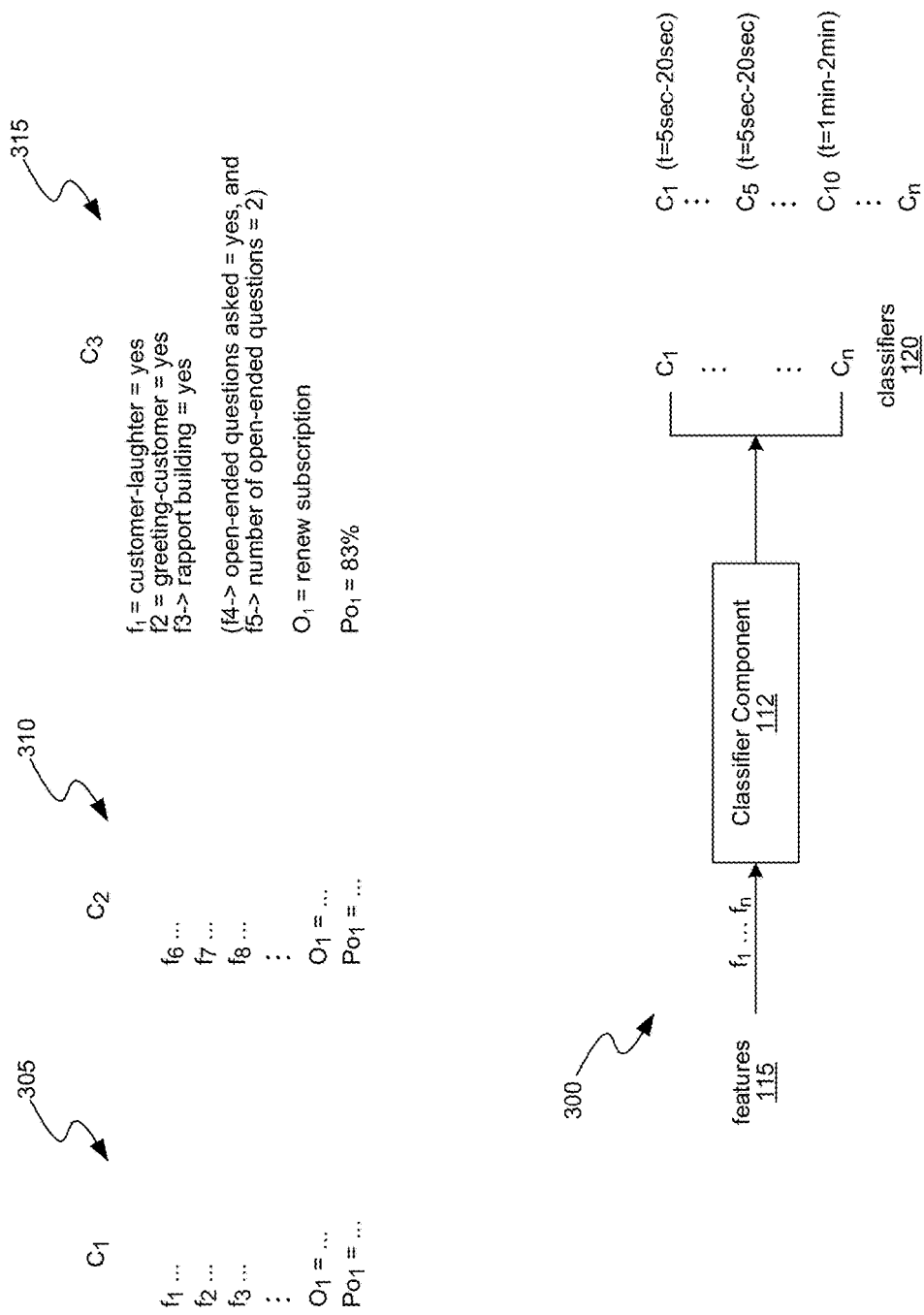
FIG. 3 is a block diagram of a classifier component of the call-modeling system for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to generate a number of classifiers, "C1"-"CN". In some embodiments, the classifier component 112 analyzes the features of a dedicated portion of the collected recordings, e.g., a training set, which is a subset of the entire recordings available for analysis, to generate the classifiers 120. Each of the classifiers 120 can have a value, e.g., an F-score, that indicates a prediction power of the classifier for the specified outcome. The higher the prediction power, the higher the probability of achieving the specified outcome of the classifier based on the included features. In some embodiments, the prediction power is determined by running the classifiers 120 on, e.g., a portion of call recordings that is not yet analyzed, e.g., a test set, and computing the respective F-score.

The classifiers 120 may be further analyzed to determine what features carry the largest prediction power, e.g., speech rate early in the conversation, occurrence of first interrupt by customer, names of competitors mentioned, or number of open questions thoughtfully answered, and a subset of these classifiers that have features with the largest prediction power can be used to generate the on-call guidance.

The conversation outcome depicted by the classifiers 120 can be any configurable outcome, e.g., "sales closed", "sales failed", "demo scheduled", "follow up requested," NPS-like probability of recommending to a friend, etc. In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest prediction powers (e.g., similarity of speech rate, occurrence of first interrupt by customer, extrovert/introvert matching, or gender or age agreement.)

The classifier component 112 can generate multiple classifiers for the same outcome. However, for a given outcome, different classifiers have different features. For example, the classifier component 112 can generate a first classifier 305, "C1," and a second classifier 310, "C2," for a specified outcome, "O1." However, the first classifier "C1" has a first set of features, e.g., features "f1"-"f3," and the second classifier "C2" has a second set of features, e.g., features "f5"-"f8." The features in different classifiers can have different prediction powers and contribute to the specified outcome in different degrees.

Different classifiers may be built for a different number of participants, and may consider multiple participants as a single interlocutor, or as distinct entities. Further, as described above, the classifier component 112 can generate different classifiers for different time intervals of a conversation. The classifier component 112 analyzes the features 115 extracted from the feature generation component 111 at various time intervals, e.g., seconds 00:05-00:10, seconds 00:20-00:30, minutes 1:00-2:00, covering the entire conversation duration, and generates one or more classifiers for each of those time intervals. Each classifier can correspond to a specified time interval of the conversation. For example, if "100" conversations are being analyzed, then the classifier component 112 can analyze first 5-20 seconds each of the "100" conversations and generate one or more classifiers for all the conversations corresponding to the interval of 5-20 seconds. Similarly, it can generate one or more classifiers corresponding to the 10-25 seconds interval. If more than one classifier is generated for a specified time interval, in some embodiments, different classifiers can have different outcomes, and in some embodiments, can have the same outcome; however, different classifiers will have different sets of features that contribute to the corresponding outcome. In the example 300, classifiers C1 and C5 correspond to a time window of seconds 00:05-00:20 of the conversations analyzed, and classifier C10 corresponds to minute 1:00-2:00 of the conversations.

The classifier 315, "C3," includes an example set of features extracted from analyzing various sales calls. The classifier 315 corresponds to the first two minutes of the conversations, and indicates that when laughter from the customer is registered and the representative greets the customer, indulges in rapport building and poses at least two open-ended questions, then there is a high chance, e.g., 83%, of renewal of a magazine subscription. The features and outcome of the classifier 315 "C3" can be "f1->customer laughter=yes" "f2->greeting customer=yes," "f3->rapport building=yes," ("f4->open ended questions asked=yes," and "f5->number of open ended questions asked=2"), "outcome=renew subscription" "probability of outcome=83%."

Figure 4:
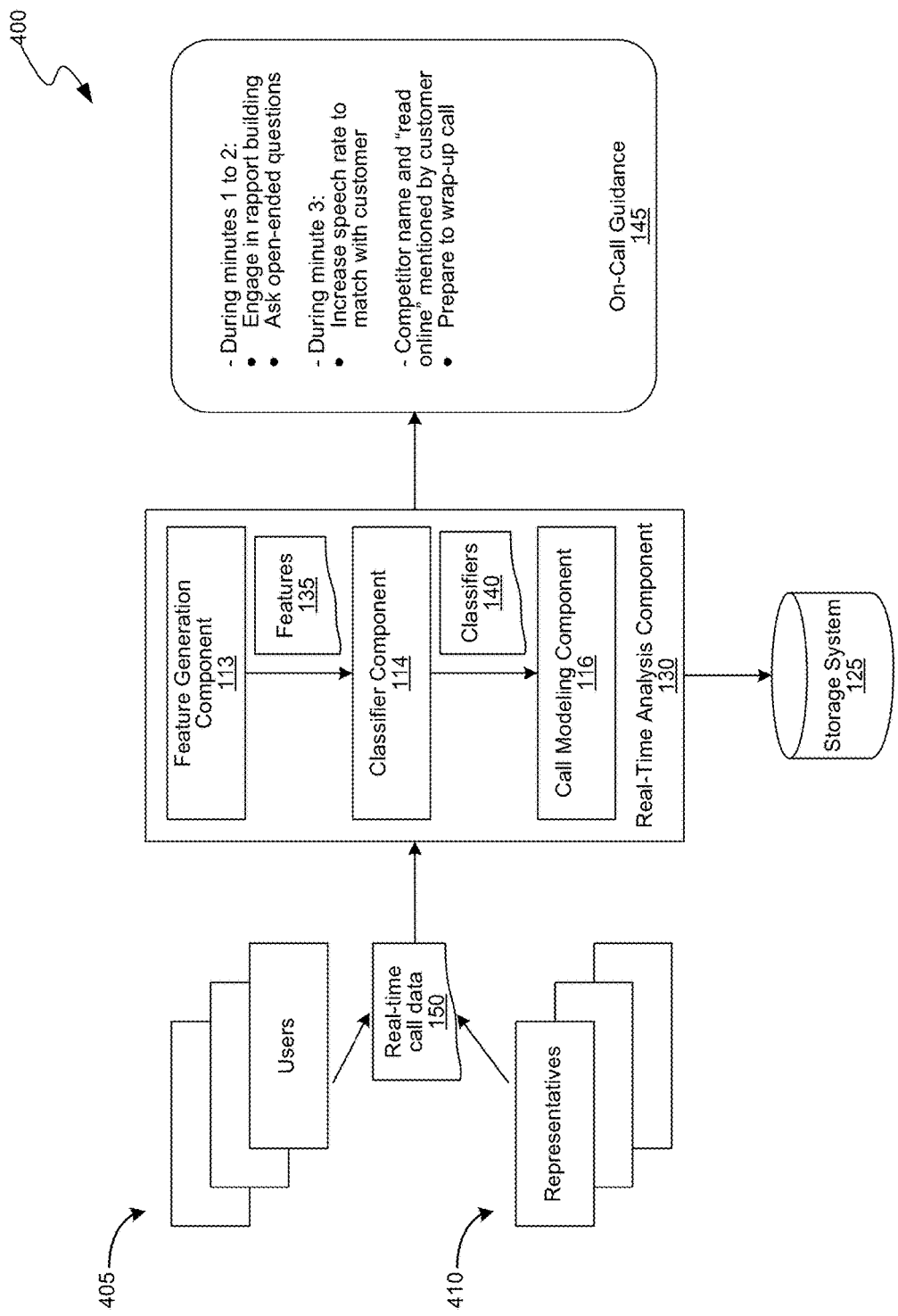
FIG. 4 is a block diagram of a real-time analysis component of the call-modeling system for generating on-call guidance for a representative during a call between the representative and a customer, consistent with various embodiments.

The classifiers 120 can be used by the real-time analysis component 130, e.g., as described at least with reference to FIG. 1 above and FIG. 4 below, to generate an on-call guidance for representatives or both inbound and outbound calls. FIG. 4 is a block diagram of the real-time analysis component of FIG. 1 for generating on-call guidance for a representative during a call between the representative and a customer, consistent with various embodiments. In some embodiments, the real-time analysis component 130 takes as input a live conversation stream, e.g., real-time call data 150, between a representative 410 and a customer 405, uses the feature generation component 113 to extract call features 135, e.g., as described above at least with reference to FIGS. 1 and 3.

The classifier component 114 feeds the call features 135 into the classifiers 120 generated by the offline analysis component 110 and selects a subset of the classifiers 120, e.g., a set of classifiers 140, that includes features that match with the call features 135 extracted from the live conversation stream. In some embodiments, the set of classifiers 140 chosen by the call-modeling component 116 are also the classifiers that have high predictability power, e.g., as measured using an F-score and that have an F-score exceeding a specified threshold.

The call-modeling component 116 then generates an on-call guidance 145, which includes information regarding real-time probabilities for specific outcomes to which the set of classifiers 140 correspond. The on-call guidance 145 may be used to notify the representative and/or their managers of the predicted outcome of the call. Additionally, the call-modeling component 116 can further analyze the set of classifiers 140 to determine classifiers that include features with the largest prediction powers, and present the values of those features in the on-call guidance 145 for suggesting the representative and/or their managers to modify or persist with an on-call behavior consistent with those features. For example, if one of the set of classifiers 140 predicts that conversations with rapport building and several open-ended questions being posed at the first few minutes of the conversation lead to favorable outcomes, the call-modeling component 116 may notify the representative and/or their managers as part of the on-call guidance 145 to engage in rapport building and pose questions at early stages of the conversation. Similarly, if one of the classifiers from the set of classifiers 140 indicates that matching speech rate to within 10% of customer's rate at a specified relative position of the call, e.g., during third minute of the call, leads to improved closing results, the call-modeling component 116 may notify the representative and/or their managers as part of the on-call guidance 145 to adjust their speech rate accordingly. On the other hand, if one of the classifiers from the set of classifiers 140 indicates that conversations beginning with over a specified number of objections, naming a specific competitor and mention of the phrase "read online" do not lead to good results, the call-modeling component 116 may notify the representative and/or their managers as part of the on-call guidance 145 to expedite wrap-up of conversations to avoid losing time on a call that is not likely to yield desired results.

In addition to live on-call guidance, the real-time analysis component 130 may be used to provide the representative and/or their managers with non-real time analysis as well, which provides insight into details of the conversations, e.g., what occurred in the conversations, when events occurred, and various such quantifiable analytics of the calls. For example, the classifiers can be used to find interesting calls that would interest the representatives to listen and learn from. The disclosed embodiments can be used to improve outcomes of the call not only during a real-time or a live call, but could also be used to inform representatives and/or managers for better training and coaching in retrospect.

The real-time analysis component 130 may also be used to auto-populate information fields in a customer relationship management (CRM) system or a similar system.

Figure 5:
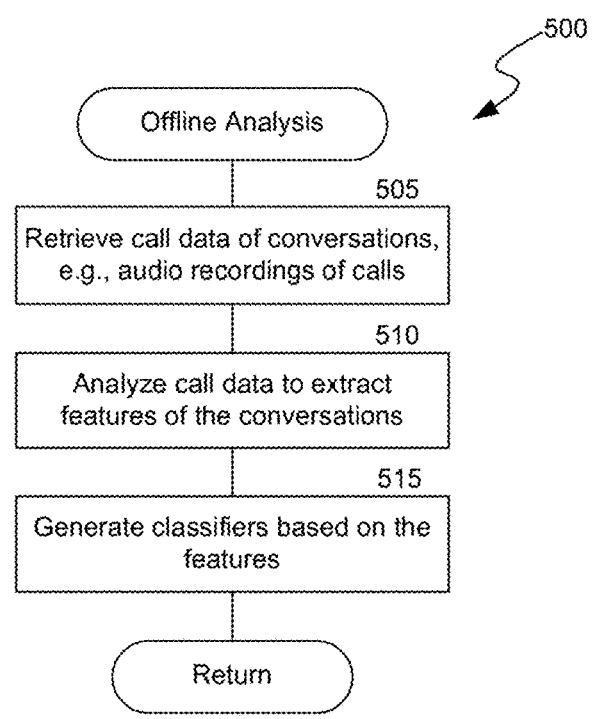
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call-modeling system 100 of FIG. 1. At block 505, the offline analysis component 110 retrieves historical call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., speech rate, speech volume, tone, and timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, charisma, confidence, etc.) and personal attributes (e.g., age, accent, and gender). The feature generation component 111 can also analyze the call data 105 to generate various tags as described above.

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability of recommending to a friend," NPS, or customer satisfaction. Each of the classifiers indicates a specific outcome and can include a set of the features that contributed to the specific outcome. For example, in a sales call for renewing a magazine subscription, a classifier "C1" can indicate that when laughter by a customer and two open-ended questions from the representative are registered, there is a high chance, e.g., 83%, of renewal. The classifier component 112 can generate multiple classifiers for the same outcome; however, they have distinct sets of features. Further, the classifier component 112 generates different classifiers for different time windows of the conversations. For example, the classifier component 112 generates a classifier "C1" for first two minutes of the conversations and a classifier "C2" for a third minute of the conversations. The offline analysis component 110 can store the features 115 and the classifiers 120 in a storage system 125.

Figure 6:
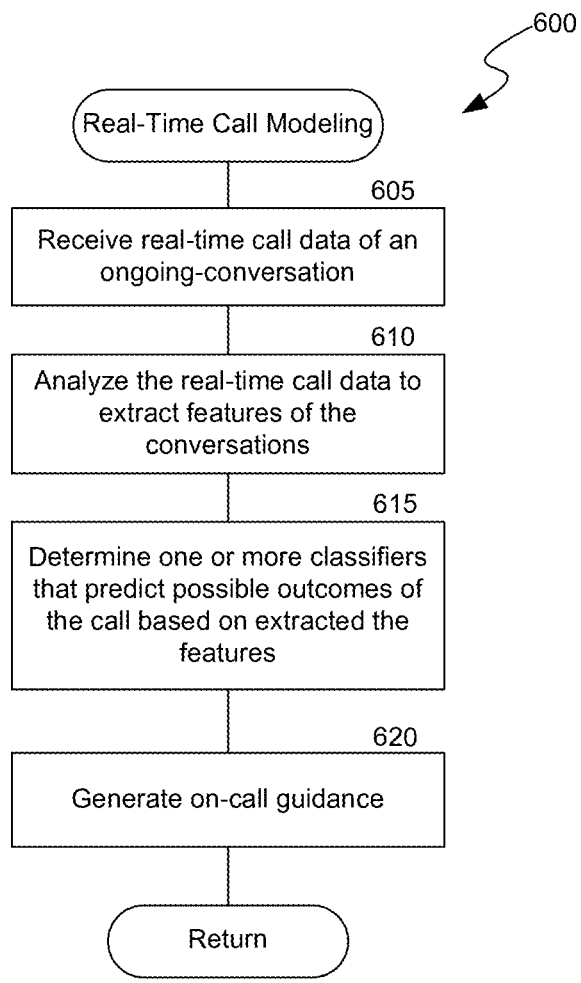
FIG. 6 is a flow diagram of a process for modeling calls between the participants to generate on-call guidance, consistent with various embodiments.

FIG. 6 is a flow diagram of a process 600 for modeling calls between participants to generate on-call guidance, consistent with various embodiments. In some embodiments, the process 600 can be implemented in the call-modeling system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2. The feature generation component 113 can also analyze the real-time call data 150 to generate various tags as described above.

At block 615, the classifier component 114 inputs the extracted features to classifiers in the storage system, e.g., classifiers 120 which are generated as described at least with reference to process 500 of FIG. 5, to determine one or more classifiers that predict possible outcomes of the call based on the extracted features. For example, as described at least with reference to FIGS. 1 and 4, the classifier component 114 feeds the extracted features 135 into the classifiers 120 generated by the offline analysis component 110, and selects a subset of the classifiers 120, e.g., a set of classifiers 140, that includes features that match with the call features 135 extracted from the live conversation stream. In some embodiments, the set of classifiers 140 include classifiers whose prediction power exceeds a specified threshold. The set of classifiers 140 corresponds to specific outcomes and include real-time probabilities for the specific outcomes.

At block 620, the call-modeling component 116 generates on-call guidance, e.g., on-call guidance 145, that presents the real-time probabilities of possible outcomes of the call as indicated by the set of classifiers 140. The call-modeling component 116 can further analyze the set of classifiers 140 to determine features that have high prediction power, e.g., prediction power exceeding a specified threshold, for predicting a desired outcome, and then include those features and values associated with those features in the on-call guidance 145. The on-call guidance 145 notifies the representative to adopt or persist with an on-call behavior consistent with those features to achieve the desired outcome, or at least to increase the probability of achieving the desired outcome. For example, the on-call guidance 145 can present instructions on a display screen of a user device associated with the representative recommending the representative to change the rate of speech, use specific key words, or pose more open-ended questions to the customer in order to increase the probability of achieving the desired outcome.

Example Usage of the Embodiments

The following is an example usage of the disclosed embodiments for modeling sales calls for renewal of a subscription for a magazine. At a first stage, e.g., before a call is received from a live customer or before a call is placed by a representative, a number of recordings of previous calls is processed by the offline analysis component 110, e.g., using an ASR component 210 that is customized for the field of surgery institutions, an NLP component 225, an affect component 215 and a metadata component 220 to generate various features. The classifier component 112 generates two classifiers, based on those features, that can be found to be highly predictive: (a) a first classifier based on the first two minutes of one or more of the analyzed conversations, which indicates that when a laughter by the customer is registered, the representative engages in rapport building, and at least two open-ended questions are posed by the representative, then there is a high chance, e.g., 83%, of subscription renewal; (b) a second classifier based on the third minute of one or more of the analyzed conversations, which indicates that when a competitor magazine or the key-phrase "read online" is used, and/or the speech rate of the customer is more than three words per second, the renewal chances drop to 10%.

The above two classifiers can then be used by the real-time analysis component 130 in a second stage, e.g., during a live call between the representative and the customer, for generating an on-call guidance to guide the sales representatives as follows. Based on the first classifier, the real-time analysis component 130 can indicate to the sales representative to ask questions within the first 2 minutes. Based on the second classifier, the real-time analysis component 130 can, at minute three of the conversation, urge the representative to reduce speech rate to get the customer to mirror their own speech rate if a competitor is mentioned or otherwise the phrase "read online" is used. If the speech rate is not reduced, the real time analysis component 130 can indicate to the representative and/or their managers to wrap up the call as soon as possible.

The embodiments disclosed above may be implemented as separate modules, e.g., as presented above, as a single module, or any combination thereof. Implementation details may vary, including core machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
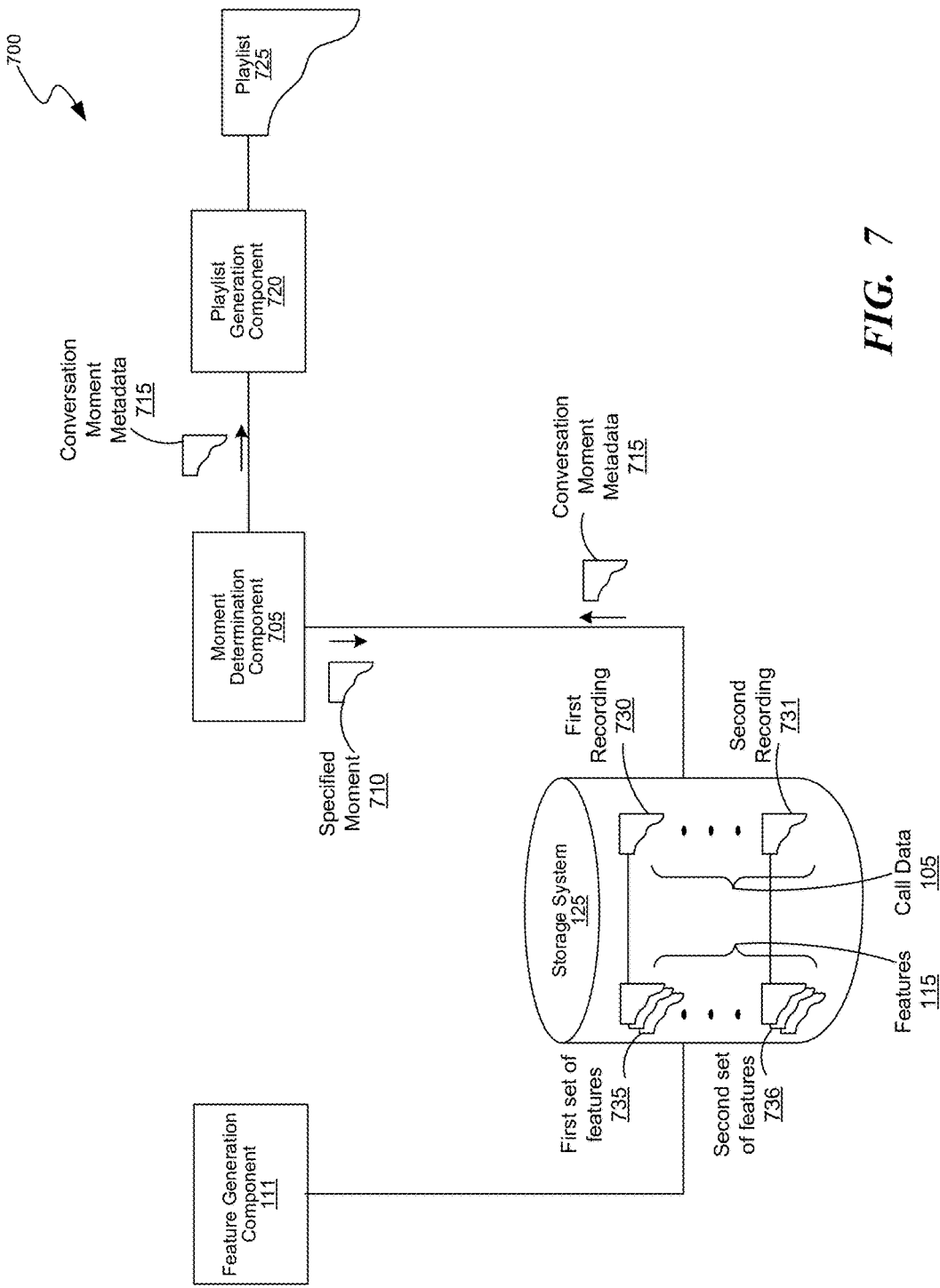
FIG. 7 is a block diagram of a moment identification system, consistent with various embodiments.

FIG. 7 is a block diagram of a moment identification system, consistent with various embodiments. The moment identification system 700 can determine conversations having a specified moment 710, and generate a playlist 725 of the conversations having the specified moment 710. The moment identification system 700 includes a feature generation component, such as feature generation component 111 of FIG. 1, that generates features 115 of the conversations by analyzing the recordings of the conversations, which are stored as call data 105 in the storage system 125. The moment identification system 700 includes a moment determination component 705 that determines the conversations having the specified moment 710 and generates conversation moment metadata 715 having information regarding the specified moment 710 in a particular conversation. The moment identification system 700 includes a playlist generation component 720 that generates the playlist 725 based on the conversation moment metadata 715.

The call data 105 can include recordings of a number of conversations between multiple participants. For example, the call data 105 can include (a) a first recording 730, which is a recording of a telephone conversation between a first sales representative of an organization and a first customer of the organization, and (b) a second recording 731, which is a recording of a telephone conversation between a second sales representative of the organization and a second customer of the organization. Note that the recordings can be of a conversation that is any of telephone based, VoIP based, video conference based, VR based, AR based, e-mail based, or in-person interaction based.

The feature generation component 111 can analyze the call data 105 to extract the features of the conversations. For example, the feature generation component 111 analyzes the first recording 730 to extract a first set of features 735 of the conversation in the first recording 730, and analyzes the second recording 731 to extract a second set of features 736 of the conversation in the second recording 731. In some embodiments, the first set of features 735 and the second set of features 736 are a subset of the features 115. The features 735 can include transcripts of the conversations, vocabulary, semantic information of conversations, summarization of a call, summarizations of utterances and various natural language entailments, voice signal associated features (e.g., speech rate, speech volume, tone, and timber), detected emotions (e.g., fear, anger, happiness, timidity, fatigue, laughter), detected personality traits (e.g., trustworthiness, engagement, likeability, dominance, charisma, confidence, etc.), personal attributes (e.g., age, accent, and gender), and inter-speaker attributes that indicate a comparison between both the participants (e.g., similarity of speech rate between the representative and the customer, extrovert/introvert matching, or gender or age agreement). Further, the features 735 can include not only aural features, but also non-aural features, e.g., visual features such as body language of a participant, and facial expressions of the participant, or any combination of aural and non-aural features. The features 735 can also include information that indicates with which participant a particular feature is associated with. For example, if laughter is identified as one of the features 735, then the corresponding feature can also include information which indicates whether the laughter is from a first participant (e.g., a sales representative) or a second participant (e.g., a customer) in the conversation. Further, the features could also be generated from the transcripts of any of emails, online messages, and online meetings. In some embodiments, the feature generation component 111 can determine that any of a word, a phrase, a text, emoji, symbols, or a combination thereof can convey a particular feature. For example, the feature generation component 111 can determine that a text such as "Ha Ha" or "rofl" in the transcript can indicate laughter.

The moment determination component 705 can analyze the features of the conversations to determine whether a particular conversation has the specified moment 710. For example, the moment determination component 705 can analyze the features 735 of the conversation in the first recording 730 to determine whether the conversation has the specified moment 710. The specified moment 710 can be any of a number of moments, such as "laughter," "laughter by a customer," "laughter by a sales representative," "participant picking his nose," "participant walking out of the meeting," "participant having a specific facial expression," "discussion on budget," "discussion on pricing," "discussion on renewal of subscription," "prospect engaged by a sales representative's question", etc. The moment determination component 705 can determine whether any of the features 735 of the conversation correspond to the specified moment 710. In some embodiments, the moment determination component 705 can determine that the conversation has the specified moment 710 if one or more of the features 735 correspond to the specified moment 710 directly, or if the specified moment 710 can be derived from one or more of the features 735. For example, if the specified moment 710 is "angry," and one of the features 735 indicates that a participant is angry, then the moment determination component 705 can determine that the conversation has the specified moment 710 based on direct correspondence of the features with the specified moment 710. However, if one or more of the features 735 indicate that a pace of the speech of a participant is "fast talking" and a tone of the speech as "high pitch," or a facial expression indicates anger, or if the words used in a chat indicates anger, the moment determination component 705 can derive that the participant is "angry" based on the above features and thus, determine that the conversation has the specified moment 710.

After identifying the features that correspond to the specified moment 710, the moment determination component 705 generates the conversation moment metadata 715, which includes information regarding the specified moment 710 in the conversation of the first recording 730. The conversation moment metadata 715 can include a variety of information, such as an identification of the specified moment 710, the features that correspond to the specified moment 710, and a location at which each of the identified features is present in the first recording 730. A moment can occur one or more times in a conversation. For example, if the specified moment 710 is "laughter," and it occurs more than once in a conversation, and the moment determination component 705 can identify such multiple occurrences of "laughter" in the conversation. The conversation moment metadata 715 can include information regarding each of the multiple occurrences of the specified moment 710. For example, if feature "$f_1$" corresponds to a first occurrence of "laughter" at minute 5 of the first recording 730, feature "$f_2$" to corresponds to a second occurrence of "laughter" at minute 6 of the first recording 730, and features "$f_3$" and "$f_4$" both combined correspond to a third occurrence of "laughter" at minute 7 of the first recording 730, the conversation moment metadata 715 includes information regarding features "$f_1$"-"$f_4$" and their respective locations in the first recording 730.

The moment determination component 705 can similarly analyze the features of conversations in other recordings, identify those of the conversations having one or more features that correspond to the specified moment 710, and update or generate the conversation moment metadata 715. The conversation moment metadata 715 can be generated as a single data object for each of the conversations having the specified moment 710, or as one single data object having moment information for all the identified conversations.

The playlist generation component 720 can generate the playlist 725 by including conversations identified by the moment determination component 705 as having the specified moment 710. The playlist 725 can either include the entire conversation which has the specified moment 710 or a snippet or portion of the conversation that has the specified moment 710. In some embodiments, the playlist 725 includes a portion of the conversation that has the specified moment 710. For example, if the specified moment 710 occurred at 1 minute 10 seconds of the first recording 730, the playlist 725 can include a portion of the first recording 730 corresponding to 1 minute 10 seconds, such as from 40 seconds to 1 minute and 40 seconds of the first recording 730. The playlist generation component 720 can include a portion of the conversation that happens immediately prior to and/or after the occurrence of the specified moment 710 in order to provide a context of the conversation around the specified moment 710. In some embodiments, the duration of the conversation prior to and/or after the occurrence of the specified moment 710 to be included in the playlist 725 can be configured by a consumer user of the playlist 725, such as a sales representative, a trainer, or a manager of the sales representative.

The playlist generation component 720 can generate playlists for various moments and store each of the playlists in the storage system 125. A consumer user can input various criteria based on which the playlists are to be generated for the specified moment 710. For example, the playlist generation component 720 can generate playlists that are specific for an entity. That is, the playlist generation component 720 can generate a playlist that includes only those of the conversations that have the specified moment 710 and are associated with a specific entity, e.g., an organization, a representative, a customer, a customer-representative pair, etc. For example, the playlist generation component 720 can generate a playlist of the specified moment 710 for conversations of a specific sales representative, a specific customer, a specific sales representative-customer pair, a specific group of users, or a specific organization. The playlist generation component 720 can also generate context-aware playlists, e.g., based on time or location, at which the conversations took place. For example, the playlist generation component 720 can generate a playlist of the specified moment 710 for conversations that happened during a night shift, e.g., from 9 pm to 6 am.

The playlist generation component 720 can facilitate tagging of playlists, e.g., for discovery, navigation and easy access. As described above, a tag can be used to specify a variety of information, such as, a specific moment, a specific entity, and/or a specific context for which the playlist is generated.

The specified moment 710 can be a user-specified moment or system-learned moment. For example, some moments can be referred to as "interesting" moments. A consumer user of the playlist 725 can define what moments are interesting, e.g., "laughter," discussions on topics such as "budget" or "pricing," and input one or more of them as the specified moment 710. In some embodiments, the moment determination component 705 can automatically determine what moments may be interesting to the consumer users and use one or more of those moments to generate the playlist 725. The moment determination component 705 can automatically determine certain moments as interesting moments in various ways. In some embodiments, the moment determination component 705 can identify the interesting moments based on a usage pattern of a recording of a conversation. For example, the moment determination component 705 can identify a particular portion of the conversation as associated with an interesting moment if the portion has been tagged, e.g., with comments indicating a topic discussed in the portion, if the particular portion is played or listened to more than a threshold number of times or more than the other portions of the conversation.

In some embodiments, the moment determination component 705 can identify the interesting moments based on an anomaly in a conversation. For example, the moment determination component 705 can identify a portion of the conversation in which a participant starts to speak at a pace greater than a specified threshold or compared to the pace in other portions of the conversation, as being associated with an interesting moment. In another example, the moment determination component 705 can identify a portion of the conversation in which a participant exits a meeting room while the meeting is still in progress as being associated with an interesting moment. In yet another example, the moment determination component 705 can identify a portion of the conversation in which a participant has a particular facial expression as being associated with an interesting moment. In still another example, the moment determination component 705 can identify a portion of the conversation which is played in a speed or at a volume level different from the other portions as being associated with an interesting moment. In still another example, the moment determination component 705 can identify a portion of the conversation as being associated with an interesting moment based on a number of clicks associated with the portion of the conversation. A consumer user can click on a portion of the recording to perform a number of actions, such as add a tag, add a comment, or indicate a player to play the recording from the clicked portion. The moment determination component 705 can identify various such moments as interesting moments, and the playlist generation component 720 can generate a playlist for the identified interesting moments. In some embodiments, the moment determination component 705 uses at least one of AI and ML techniques to automatically identify "interesting" moments. Usage of at least one of AI or ML by the moment determination component 705 may use a set of examples given for training to model and identify either a previously determined moment (e.g., "laughter") or a novel, previously unspecified, type of moment (e.g., "sales reps touching his hair while discussing budget").

Figure 8:
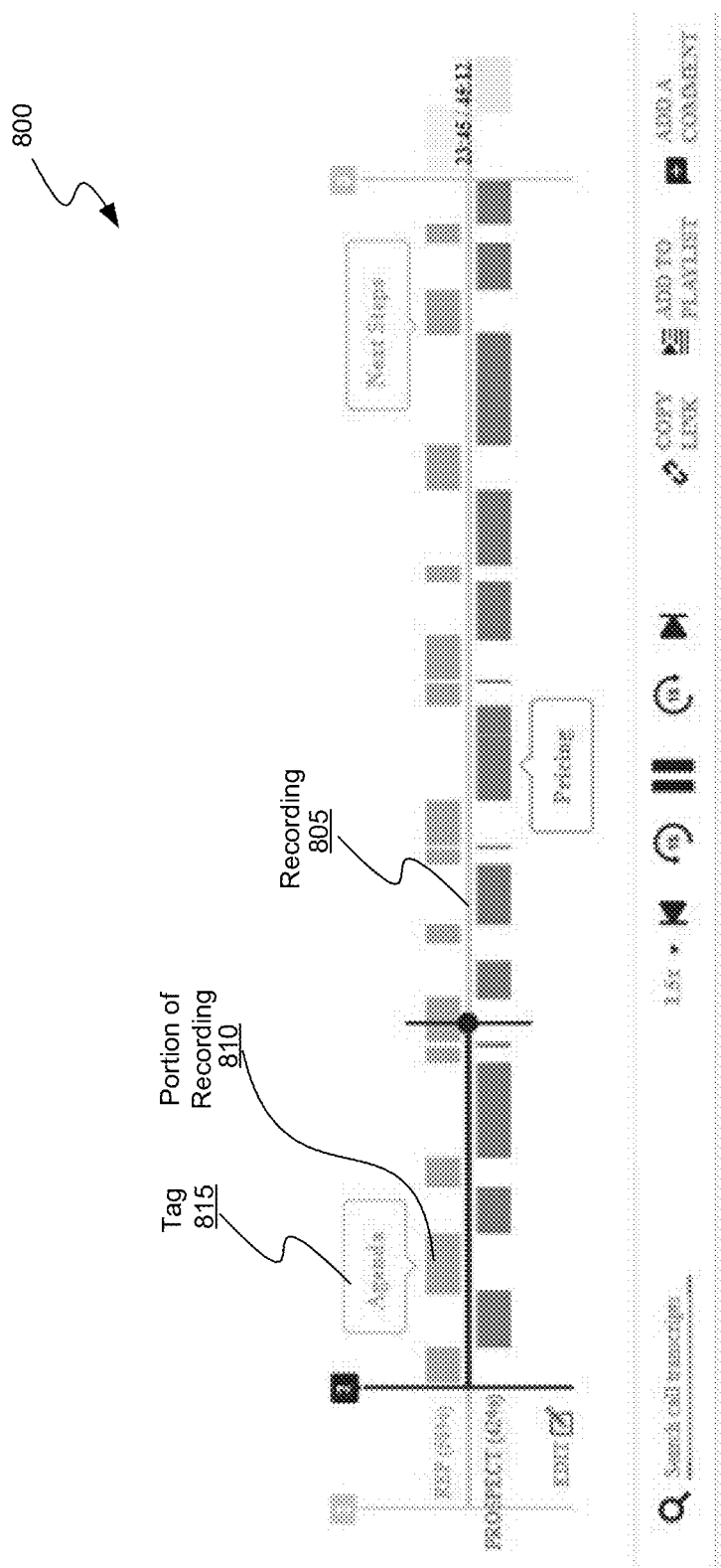
FIG. 8 is an example screenshot of a player tool to play a recording of the conversation, consistent with various embodiments.

FIG. 8 is an example screenshot of a player tool to play a recording of the conversation, consistent with various embodiments. The player tool 800 can be used to, among others, play a recording of a conversation 805. In some embodiments, the recording 805 is similar to the first recording 730 of FIG. 7. A consumer user can click on the recording 805 to perform an action. For example, the consumer user can click on a first portion 810 of the recording 805 to add a tag 815, e.g., to indicate a topic discussed in the first portion 810 of the conversation. As described above, a tag can indicate a variety of information, e.g., a trait of a participant, a call outcome, a moment of a conversation, or a summary of the conversation. The consumer user can click on the first portion 810 multiple times to perform multiple different actions. Similarly, the consumer user can click on any other portion of the recording 805 to perform a corresponding action. The number of clicks associated with a portion can be used in determining whether a portion of the conversation may have an interesting moment.

Figure 9:
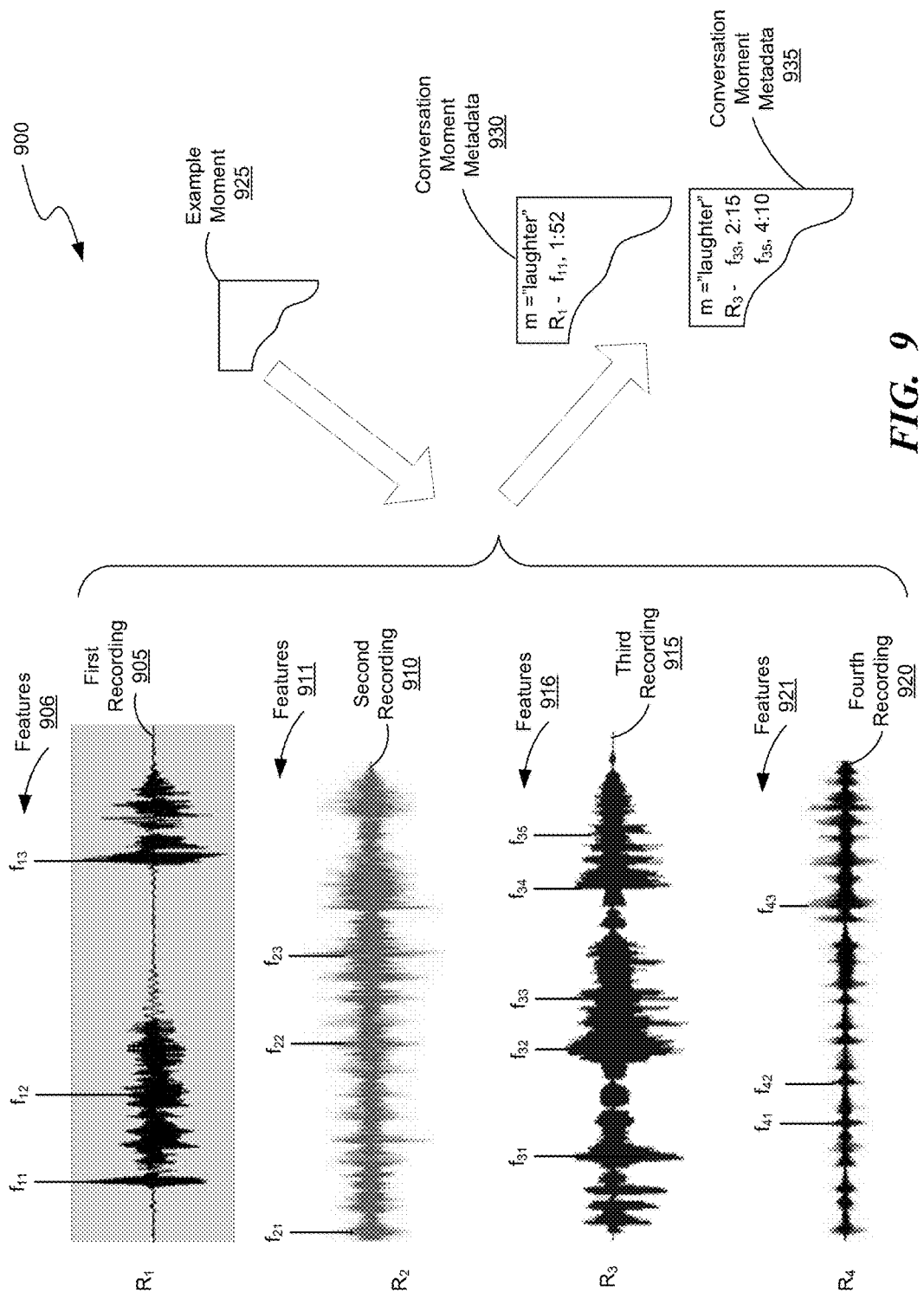
FIG. 9 is a block diagram an example for identifying conversations having a specified moment, consistent with various embodiments.

FIG. 9 is a block diagram an example 900 for identifying conversations having a specified moment, consistent with various embodiments. In some embodiments, the example 900 can be implemented using the moment identification system 700 of FIG. 7. The example 900 includes multiple recordings, such as a first recording 905, a second recording 910, a third recording 915 and a fourth recording 920. The recordings can be part of the call data 105, and can be similar to that of the first recording 730.

The feature generation component 110 can extract features of the recordings to generate a first set of features 906, $f_{11}$-$f_{13}$, of the first recording 905, a second set of features 911, $f_{21}$-$f_{23}$, of the second recording 910, a third set of features 916, $f_{31}$-$f_{35}$, of the third recording 915, and a fourth set of features 921, $f_{41}$-$f_{43}$, of the fourth recording 920.

The example moment 925 for which a playlist of the conversations is to be generated can be similar to the specified moment 710. Further, consider that the example moment 925 is "laughter."

As described above, the moment determination component 705 can determine whether a conversation has a moment by determining whether any of the features of the conversation correspond to the moment. For example, the moment determination component 705 determines that the feature $f_{11}$ of a conversation of the first recording 905, and features $f_{33}$ and $f_{35}$ of a conversation of the third recording 915 correspond to the example moment 925 of "laughter."

The moment determination component 705 generates conversation moment metadata 930 for the first recording 905 and conversation moment metadata 935 for the third recording 915. In some embodiments, the conversation moment metadata 930 and 935 are similar to the conversation moment metadata 715. The conversation moment metadata 930 includes information such as the example moment 925 for which the conversation moment metadata 930 is generated, the feature $f_{11}$ of the first recording 905 that corresponds to the example moment 925 and the location of the feature $f_{11}$ in the first recording 905, e.g., 1 minute and 52 seconds of the first recording 905. Similarly, the conversation moment metadata 935 includes information such as the example moment 925 for which the conversation moment metadata 935 is generated, the features $f_{33}$ and $f_{35}$ of the third recording 915 that correspond to the example moment 925 and the location of the features in the third recording 915, e.g., the features $f_{33}$ and $f_{35}$ occur at 2 minute and 15 seconds and 4 minute and 10 seconds of the third recording 915, respectively.

Figure 10:
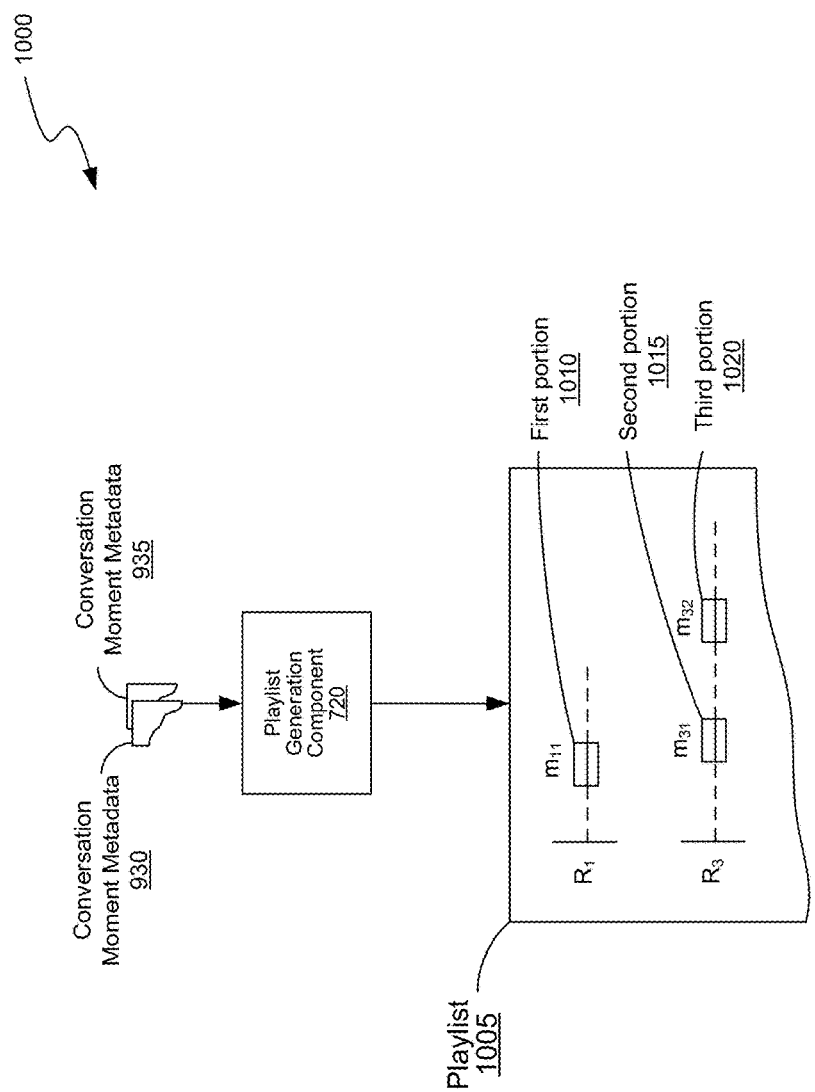
FIG. 10 is a block diagram of an example for generating a playlist of a moment, consistent with various embodiments.

FIG. 10 is a block diagram of an example for generating a playlist of a moment, consistent with various embodiments. In some embodiments, the example 900 can be implemented using the moment identification system 700 of FIG. 7. The playlist generation component 720 can generate the playlist 1005 for the example moment 925 based on the conversation moment metadata of various conversations, e.g., conversation moment metadata 930 and 935. In some embodiments, the playlist 1005 is similar to the playlist 725. The playlist generation component 720 analyzes the conversation moment metadata to identify the conversations having the example moment 925 and includes the identified conversations in the playlist 1005. For example, the playlist generation component 720 determines, based on the conversation moment metadata 930 and 935, that the first recording 905 and the third recording 915 include the example moment 925. Accordingly, the playlist generation component 720 includes two conversations in the playlist 1005—the first recording 905 and the third recording 915.

In some embodiments, the playlist generation component 720 includes only a portion of the recording that includes the example moment 925. For example, based on the conversation moment metadata 930, the playlist generation component 720 determines that a first occurrence of the example moment 925 ($m_{11}$) in the first recording 905 is at 1 minute and 52 seconds. Similarly, based on the conversation moment metadata 935, the playlist generation component 720 determines that a first occurrence of the example moment 925 ($m_{31}$) in the third recording 915 is at 2 minute and 15 seconds and a second occurrence ($m_{32}$) is at 4 minute and 10 seconds. Accordingly, for the first recording 905, the playlist generation component 720 includes a first portion 1010 of the first recording 905 corresponding to the 1 minute and 52 seconds, and for the third recording 915, a second portion 1015 and a third portion 1020 corresponding to 2 minute and 15 seconds and 4 minute and 10 seconds, respectively.

As described above at least with reference to FIG. 7, the playlist generation component 720 when including a portion of the conversation in the playlist, it can include a portion of the conversation that happens immediately prior to and/or after the occurrence of the example moment 925 in order to provide a context of the conversation around the example moment 925. For example, if the example moment 925 occurred in the first recording 730 at 1 minute 52 seconds, the playlist generation component 720 can include 30 seconds of recording prior to and/or after the 1 minute 52 seconds mark, such as from 1 minute and 22 seconds to 2 minute 22 seconds of the first recording 905. An amount or duration of the conversation prior to and/or after a moment to be included in the playlist can be user-configurable.

The playlist 1005 can include an actual recording of the portion of the conversation or a link to a storage location from where the recording of the conversation is accessible. The link can also include a "start from" location and a "play until" location of the recording, both of which indicate a portion of the recording to be played by a player, such as a player tool 800 of FIG. 8, for playing a portion of the conversation that has the example moment 925. For example, for the first recording 905, the "start from" location can be 1 minute and 22 seconds and "play until" location can be 2 minute 22 seconds.

Figure 11:
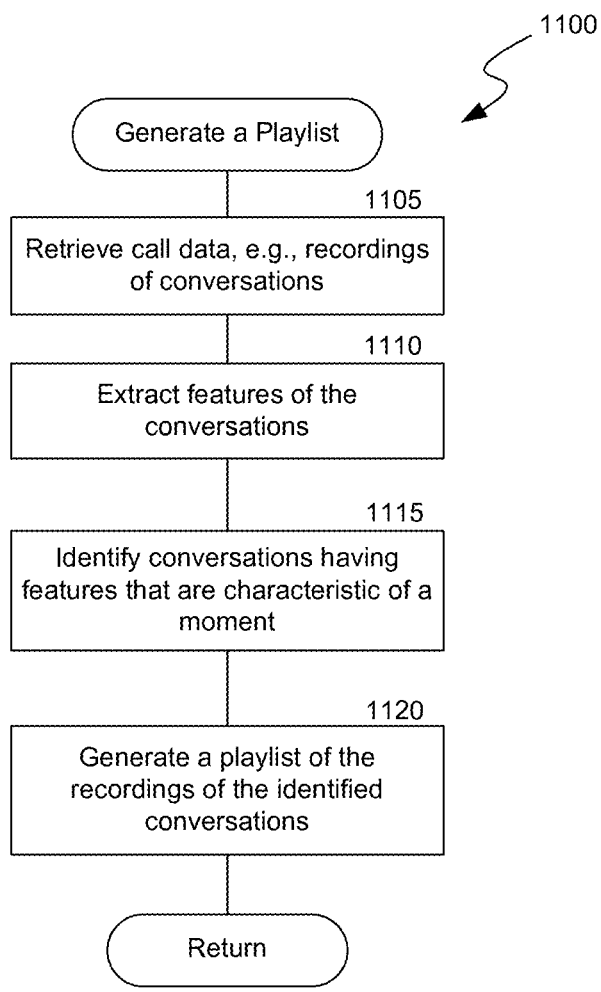
FIG. 11 is a flow diagram of a process for generating a playlist of conversations having a specified moment, consistent with various embodiments.

FIG. 11 is a flow diagram of a process for generating a playlist of conversations having a specified moment, consistent with various embodiments. In some embodiments, the process 1100 can be implemented using the moment identification system 700 of FIG. 7. As described above, a moment can be a specific event or an occurrence of a specific characteristic in the conversation. Further, the moment can be any event or occurrence that is of specific interest for a specific application. For example, if the specific application for which the moment identification is implemented is for coaching sales representatives to improve the outcome of the sales call, the moment can be any of occurrence of laughter in a conversation, questions asked by a customer, responses provided by the sales representative, a discussion of topics like budget, pricing, or any other idiosyncratic behavior such as a salesperson touching his face while speaking, etc. or any combination of thereof.

At block 1105, the feature generation component 111 retrieves call data, e.g., call data 105, from a storage system, e.g., storage system 125. The call data 105 can include recordings of a number of conversations between multiple participants. In some embodiments, a conversation has at least two participants, e.g., a sales representative of an organization and a customer of the organization.

At block 1110, the feature generation component 111 extracts the features of the conversations, e.g., features 115, and stores them in the storage system 125. The features may be extracted on demand or automatically, e.g., upon a recording of a conversation being stored in the storage system 125.

At block 1115, the moment determination component 705 identifies conversations having features that are characteristic of the specified moment. For example, if the playlist is being generated for a moment such as "laughter," the moment determination component 705 identifies conversations having features that are characteristic of "laughter." The moment determination component 705 can determine that a conversation has the specified moment if one or more features of the conversation corresponds to the specified moment directly, or if the specified moment can be derived from one or more of the features. In some embodiments, the moment determination component 705 can use at least one of AI or ML techniques to identify a moment in the conversation. The moment determination component 705 can generate conversation moment metadata, which can include information regarding conversations that have the specified moment, the features which correspond to the specified moment and a location of the features in the corresponding conversation.

At block 1120, the playlist generation component 720 generates a playlist of the conversations having the specified moment, such as the playlist 725 or 1005. In some embodiments, the playlist generation component 720 analyzes the conversation moment metadata to identify the conversations and portions of the identified conversations having the specified moment, and includes the portions of the identified conversations in the playlist. As described above at least with reference to FIG. 10, the playlist can include a copy of the recording of the portion of the conversation having the specified moment or a link to the recording using which the recording can be accessed from a storage location of the recording, e.g., by a player tool when the playlist is played.

Figure 12:
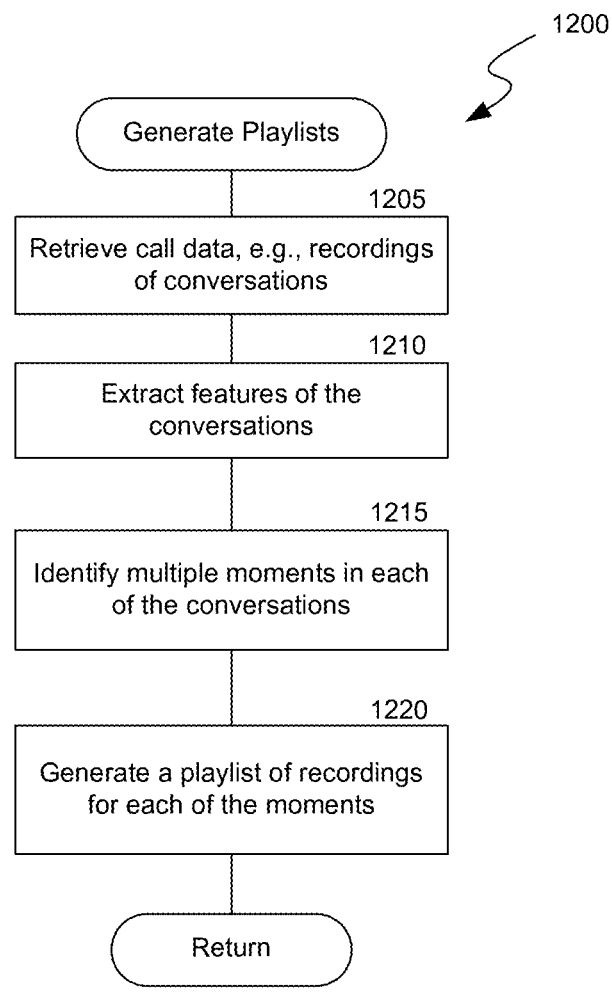
FIG. 12 is a flow diagram of a process for generating playlists of conversations for multiple moments, consistent with various embodiments.

FIG. 12 is a flow diagram of a process for generating a playlist of conversations having a specified moment, consistent with various embodiments. In some embodiments, the process 1200 can be implemented using the moment identification system 700 of FIG. 7. At block 1205, the feature generation component 121 retrieves call data, e.g., call data 105, from a storage system, e.g., storage system 125. The call data 105 can include recordings of a number of conversations between multiple participants. In some embodiments, a conversation has at least two participants, e.g., a sales representative of an organization and a customer of the organization.

At block 1210, the feature generation component 121 extracts the features of the conversations, e.g., features 125, and stores them in the storage system 125. The features may be extracted on demand or automatically, e.g., upon a recording of a conversation being stored in the storage system 125.

At block 1215, the moment determination component 705 identifies multiple moments in each of the conversations. In some embodiments, the moment determination component 705 identifies a moment in the conversation as described at least with reference to FIGS. 7 and 11. The moment determination component 705 can generate conversation moment metadata for each of the identified moments. The conversation moment metadata can include information regarding a specified moment for which it is generated, the conversations that have the specified moment, the features which correspond to the specified moment and a location of the features in the corresponding conversation.

At block 1220, the playlist generation component 720 generates a playlist of the conversations for each of the multiple moments. For example, the playlist generation component 720 generates a first playlist having those of the conversations having a first moment, e.g., laughter, and a second playlist having those of the conversations having a second moment, e.g., a participant having a specific facial expression. In some embodiments, the playlist generation component 720 generates a playlist of the conversations having a specified moment as described at least with respect to FIGS. 7, 10 and 11.

Figure 13:
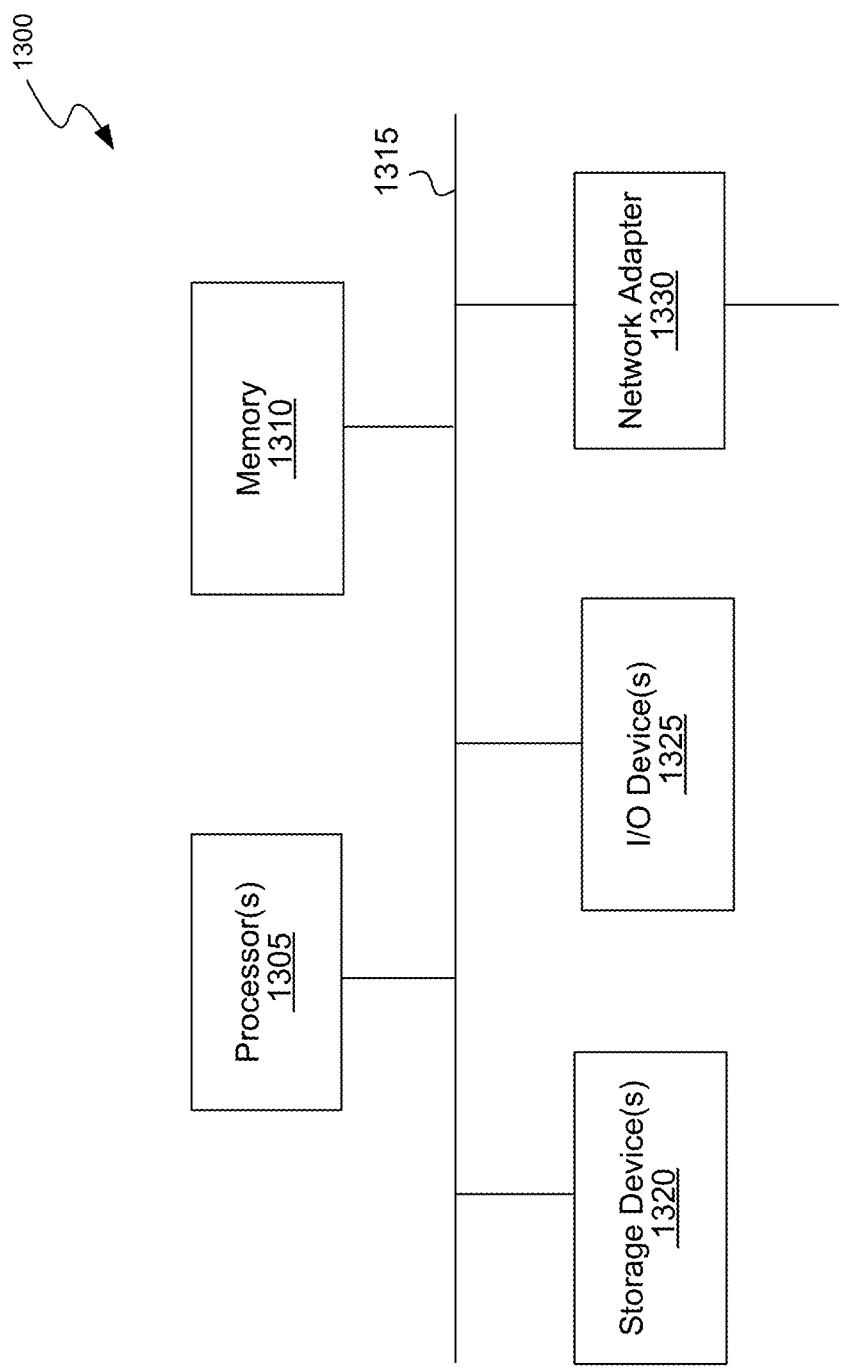
FIG. 13 is a block diagram of a processing system that can implement operations of the disclosed embodiments.

FIG. 13 is a block diagram of a computer system as may be used to implement features of the disclosed embodiments. The computing system 1300 may be used to implement any of the entities, components or services depicted in the examples of the foregoing figures (and any other components described in this specification). The computing system 1300 may include one or more central processing units ("processors") 1305, memory 1310, input/output devices 1325 (e.g., keyboard and pointing devices, display devices), storage devices 1320 (e.g., disk drives), and network adapters 1330 (e.g., network interfaces) that are connected to an interconnect 1315. The interconnect 1315 is illustrated as an abstraction that represents any one or more separate physical buses, point to point connections, or both connected by appropriate bridges, adapters, or controllers. The interconnect 1315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1310 and storage devices 1320 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1310 can be implemented as software and/or firmware to program the processor(s) 1305 to carry out actions described above. In some embodiments, such software or firmware may be initially provided to the processing system 1300 by downloading it from a remote system through the computing system 1300 (e.g., via network adapter 1330).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
retrieving multiple recordings of conversations between multiple participants, the multiple participants including multiple customers and multiple representatives, wherein each conversation includes at least one of the multiple customers and at least one of the multiple representatives;
extracting, from each of the multiple recordings, multiple features of a corresponding conversation, wherein the multiple features indicate characteristics of any of (a) a customer of the multiple customers in the corresponding conversation, (b) a participant of the multiple participants in the corresponding conversation, (c) the corresponding conversation;
identifying multiple moments of the conversations, wherein a specified moment of the multiple moments indicates an occurrence of a specified event in a corresponding conversation, the specified event characterized by one or more of the multiple features; and
generating a playlist for the specified moment, the playlist including recordings of those of the conversations having the specified moment.

2. The computer-implemented method of claim 1, wherein generating the playlist includes:
receiving, from a requesting user, a request to generate the playlist for the specified moment,
identifying those of the multiple recordings that have the specified moment to generate multiple identified recordings,
for each of the multiple identified recordings, determining a snippet of the corresponding identified recording that have the specified moment, and
generating the playlist by including the snippet from each of the identified recordings.

3. The computer-implemented method of claim 2, wherein the snippet includes a portion of a conversation corresponding to the identified recording that has (a) the specified moment, (b) a first duration of the conversation prior to the specified moment, and (c) a second duration of the conversation after the specified moment.

4. The computer-implemented method of claim 1, wherein extracting the multiple features includes:
generating features that include a transcription, vocabulary and a language model of the conversations as a first output.

5. The computer-implemented method of claim 4, wherein extracting the multiple features includes:
generating, using the first output, features that include semantic information from the conversations.

6. The computer-implemented method of claim 1, wherein extracting the multiple features includes:
generating a set of low-level features that indicate information associated with a voice signal in the multiple recordings, and a set of high-level features that include personality traits and personal attributes of the multiple participants and emotion data that indicates emotions of the multiple participants.

7. The computer-implemented method of claim 1, wherein extracting the multiple features includes generating features that include data regarding conversation flow.

8. The computer-implemented method of claim 1, wherein extracting the multiple features includes generating features related a representative-customer pair in a conversation of the conversations.

9. The computer-implemented method of claim 1, wherein extracting the multiple features includes:
generating a speaker engagement metric that includes information regarding a degree of engagement of a specified customer of the multiple customers in a conversation of the multiple conversations.

10. The computer-implemented method of claim 1, wherein extracting the multiple features includes extracting a visual feature associated with a conversation of the conversations.

11. The computer-implemented method of claim 1, wherein identifying the moments of the corresponding conversation includes:
identifying, for the specified moment and based on the multiple features of the corresponding conversation, a portion of the corresponding conversation at which the specified event occurred, the specified event indicative of a customer-related feature, a representative-related feature, or a conversation-related feature.

12. The computer-implemented method of claim 1, wherein identifying the moments of the corresponding conversation includes:
identifying an "interesting" moment in the corresponding conversation, the interesting moment identified based on user-defined criteria, usage pattern of a recording of the corresponding conversation, or anomaly in the corresponding conversation.

13. The computer-implemented method of claim 12, wherein identifying the interesting moment based on the anomaly includes:
identifying the anomaly based on a change in one of the multiple features of the corresponding conversation, an occurrence of a specified feature of the multiple features, or a frequency of occurrence of the specified feature exceeding a specified threshold.

14. The computer-implemented method of claim 12, wherein identifying the interesting moment based on the usage pattern includes:
identifying the usage pattern based on a number of times a specified portion of a recording of the corresponding conversation has been played, whether the specified portion is associated with any comment, or a speed or volume level at which the specified portion is played compared to other portions.

15. The computer-implemented method of claim 1, wherein generating the playlist includes generating a context-aware playlist, the context-aware playlist being a playlist generated for the specified moment and for those of the multiple conversations that satisfy a specified context.

16. The computer-implemented method of claim 15, wherein generating the context-aware playlist includes generating the context-aware playlist by selecting those of the multiple conversations that include a specified participant of the multiple participants.

17. The computer-implemented method of claim 15, wherein generating the context-aware playlist includes generating the context-aware playlist by selecting those of the multiple conversations that were carried out in a specified geographical location.

18. The computer-implemented method of claim 15, wherein generating the context-aware playlist includes generating the context-aware playlist by selecting those of the multiple conversations that were carried out at a specified time.

19. The computer-implemented method of claim 1, wherein extracting the multiple features includes extracting the multiple features using any of an artificial intelligence, a machine learning technique, or natural language processing technique.

20. The computer-implemented method of claim 1, wherein at least one of the multiple recordings includes a recording of a video call between one of the customers and one of the representatives.

21. The computer-implemented method of claim 1, wherein at least one of the multiple recordings includes an online meeting between one of the customers and one of the representatives.

22. The computer-implemented method of claim 1, wherein at least one of the multiple recordings includes a recording of a virtual reality-based conversation between one of the customers and one of the representatives.

23. The computer-implemented method of claim 1, wherein at least one of the multiple recordings includes a recording of an augmented reality-based conversation between one of the customers and one of the representatives.

24. The computer-implemented method of claim 1, wherein at least one of the multiple recordings includes an e-mail conversation between one of the customers and one of the representatives.

25. A non-transitory computer-readable storage medium storing computer-readable instructions, comprising:
instructions for receiving a request to generate a playlist having a set of call recordings having a specified moment, each call recording from the set of call recordings being a recording of a conversation between at least two participants, wherein one of the at least two participants is a specified representative of multiple representatives of an organization and the other of the at least two participants is a customer, wherein the specified moment indicates an occurrence of a specified event in the conversation;
instructions for extracting, from each of multiple recordings stored in a storage system, multiple features of a corresponding conversation, wherein the multiple features indicate characteristics of any of (a) a customer of the multiple customers in the corresponding conversation, (b) a representative of the multiple representatives in the corresponding conversation, (c) the corresponding conversation;
instructions for identifying those of the conversations having the specified moment as a set of conversations, wherein the specified moment is identified based on one or more of the multiple features associated with the conversations that are representative of the specified event; and
instructions for generating the playlist having the set of call recordings corresponding to the set of conversations.

26. The non-transitory computer-readable storage medium of claim 25, wherein the instructions for extracting the multiple features include:
instructions for generating at least one of aural features or video features associated with the conversation.

27. The non-transitory computer-readable storage medium of claim 25, wherein the specified moment is based on a specified video feature associated with the conversations, wherein the instructions for generating the playlist include:
instructions for generating the playlist having those of the multiple recordings which are associated with the specified video feature.

28. The non-transitory computer-readable storage medium of claim 27, wherein the instructions for generating the playlist based on the specified video feature include:
instructions for generating the playlist having those of the multiple recordings in which one of the at least two participants made a specified facial expression.

29. The non-transitory computer-readable storage medium of claim 25, wherein the specified moment is based on a specified aural feature associated with the conversations, wherein the instructions for generating the playlist include:
instructions for generating the playlist having those of the multiple recordings which are associated with the specified aural feature.

30. The non-transitory computer-readable storage medium of claim 29, wherein the instructions for generating the playlist based on the specified aural feature include:
instructions for generating the playlist having those of the multiple recordings in which one of the at least two participants uttered a specified word, discussed a specified topic, asked a specific question, or answered the specific question.

31. The non-transitory computer-readable storage medium of claim 25 further comprising:
instructions for generating multiple playlists for multiple moments; and
instructions for tagging each of the multiple playlists with information regarding the corresponding moment for which the playlist is generated.

32. The non-transitory computer-readable storage medium of claim 31 further comprising:
instructions for receiving a specified request for generating a specified playlist for a particular moment;
instructions for determining, based on the tagging, whether any of the multiple playlists is generated for the particular moment; and
instructions for returning, in response to the specified request, one of the multiple playlists that is tagged with the particular moment as the specified playlist.

33. The non-transitory computer-readable storage medium of claim 25, wherein the instructions for generating the playlist include:
instructions for identifying a portion of a conversation in a recording of the multiple recordings that has (a) the specified moment, (b) a first duration of the conversation prior to the specified moment, and (c) a second duration of the conversation after the specified moment, and
instructions for including a recording of the portion of the conversation in the playlist.

34. The non-transitory computer-readable storage medium of claim 25, wherein the instructions for identifying those of the conversations having the specified moment include:
instructions for identifying an "interesting" moment in a conversation of the multiple conversations, the interesting moment identified based on user-defined criteria, usage pattern of a recording of the conversation, or anomaly in the conversation.

35. The non-transitory computer-readable storage medium of claim 34, wherein the instructions for identifying the interesting moment based on the anomaly include:
instructions for identifying the anomaly based on a change in one of the multiple features of the conversation, an occurrence of a specified feature of the multiple features, or a frequency of occurrence of the specified feature exceeding a specified threshold.

36. The non-transitory computer-readable storage medium of claim 34, wherein the instructions for identifying the interesting moment based on the usage pattern include:

instructions for identifying the usage pattern based on a number of times a specified portion of the recording has been played, whether the specified portion is associated with any comment, or a speed or volume level at which the specified portion is played compared to other portions.

37. A system for automatic generation of a playlist of call recordings having a specified moment, the system comprising:
a first component that is configured to retrieve multiple recordings of conversations between multiple participants, the multiple participants including multiple customers and multiple representatives, wherein each conversation includes at least one of the multiple customers and at least one of the multiple representatives;
a second component that is configured to extract multiple features from the multiple recordings, wherein the multiple features includes characteristics of the multiple customers, the multiple representatives, and the conversations;
a third component that is configured to analyze the multiple recordings to identify the specified moment of the conversations, wherein the specified moment indicates an occurrence of a specified event in a conversation of the conversations, the specified event characterized by one or more of the multiple features; and
a fourth component that is configured to generate a playlist for the specified moment, the playlist including a recording of (a) a first conversation of the multiple conversations and (b) a second conversation of the multiple conversations having the specified moment.

38. The system of claim 37, wherein the fourth component is configured to generate the playlist by including a first snippet of the recording of the first conversation and a second snippet of the recording of the second conversation.

39. The system of claim 37, wherein the fourth component is configured to generate the playlist by generating a context-aware playlist, the context-aware playlist being a playlist generated for the specified moment and for those of the multiple conversations that satisfy a specified context.

40. The system of claim 39, wherein the fourth component is configured to:
select those of the multiple conversations that include a specified participant of the multiple participants to generate selected conversations, and
include recordings of the selected conversations in the context-aware playlist.

* * * * *